(12) United States Patent
Zhang et al.

(10) Patent No.: US 10,979,354 B2
(45) Date of Patent: Apr. 13, 2021

(54) SIGNAL TRANSMISSION METHOD AND APPARATUS

(71) Applicant: Huawei Technologies Co., Ltd., Shenzhen (CN)

(72) Inventors: Xi Zhang, Chengdu (CN); Lei Chen, Chengdu (CN); Mao Yan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/232,942

(22) Filed: Dec. 26, 2018

(65) Prior Publication Data

US 2019/0132247 A1 May 2, 2019

Related U.S. Application Data

(63) Continuation of application No. PCT/CN2017/086214, filed on May 26, 2017.

(30) Foreign Application Priority Data

Jun. 29, 2016 (CN) .......................... 201610497100.9

(51) Int. Cl.
*H04L 12/24* (2006.01)
*H04L 12/801* (2013.01)
(Continued)

(52) U.S. Cl.
CPC ............ *H04L 47/12* (2013.01); *H04L 5/0048* (2013.01); *H04L 41/08* (2013.01); *H04L 43/08* (2013.01);
(Continued)

(58) Field of Classification Search
CPC ...................................................... H04L 47/12
See application file for complete search history.

(56) References Cited

U.S. PATENT DOCUMENTS 6,928,120 B1* 8/2005 Zhang ................. H04L 27/2679
370/464
8,089,858 B2* 1/2012 Stadelmeier ........... H04H 20/72
370/210
(Continued)

FOREIGN PATENT DOCUMENTS

CN 103457886 A 12/2013
JP 2004336769 A 11/2004
(Continued)

OTHER PUBLICATIONS

Asim et al.,"Mitigation of Phase Noise in Single Carrier Frequency Domain Equalization Systems," Proceeding of IEEE Wireless Communications and Networking Conference (WCNC), Paris, France, pp. 920-924, Institute of Electrical and Electronics Engineers—New York, New York (Apr. 2012).
(Continued)

*Primary Examiner* — Parth Patel
(74) *Attorney, Agent, or Firm* — Leydig, Voit & Mayer, Ltd.

(57) ABSTRACT

A signal transmission method and apparatus are provided. The method includes: obtaining, by a transmitter, a to-be-sent data block; inserting one or more pilot blocks among a plurality of pieces of data of the to-be-sent data block based on an agreed position; and sending, by the transmitter, the to-be-sent data block into which the one or more pilot blocks are inserted. Inserting the one or more pilot blocks among the plurality of pieces of data of the to-be-sent data block can improve a phase noise compensation effect for a receiver without increasing pilot overheads.

15 Claims, 17 Drawing Sheets

(51) Int. Cl.
*H04L 5/00* (2006.01)
*H04L 12/26* (2006.01)
*H04L 27/26* (2006.01)

(52) U.S. Cl.
CPC ........ *H04L 5/0091* (2013.01); *H04L 27/2613* (2013.01)

(56) References Cited

U.S. PATENT DOCUMENTS

| | | | | |
|---|---|---|---|---|
| 8,666,387 | B2* | 3/2014 | Tee | H04B 17/336 455/423 |
| 8,897,412 | B2* | 11/2014 | Hewavithana | H04L 27/2647 375/316 |
| 9,036,570 | B2* | 5/2015 | Vrzic | H04W 36/385 370/329 |
| 10,135,589 | B2* | 11/2018 | Wang | H04B 7/04 |
| 10,327,213 | B1* | 6/2019 | Han | H04L 25/03343 |
| 2007/0041311 | A1* | 2/2007 | Baum | H04L 5/0048 370/208 |
| 2007/0189404 | A1* | 8/2007 | Baum | H04L 25/0228 375/260 |
| 2008/0068980 | A1* | 3/2008 | Lim | H04L 5/0048 370/208 |
| 2009/0041087 | A1* | 2/2009 | Yamasuge | H04L 1/0047 375/130 |
| 2011/0293042 | A1* | 12/2011 | Rosenhouse | H04L 25/0232 375/316 |
| 2012/0014244 | A1* | 1/2012 | Kishigami | H04J 13/12 370/209 |
| 2014/0010324 | A1* | 1/2014 | Kenney | H04L 27/22 375/284 |
| 2014/0133597 | A1* | 5/2014 | Hahm | H04L 27/2647 375/295 |
| 2014/0198675 | A1* | 7/2014 | He | H04L 5/0048 370/252 |
| 2014/0254697 | A1* | 9/2014 | Zhang | H04L 5/0051 375/260 |
| 2015/0071375 | A1* | 3/2015 | Kwon | H04L 27/2628 375/295 |
| 2016/0056934 | A1* | 2/2016 | Li | H04L 5/0048 370/330 |
| 2016/0057753 | A1 | 2/2016 | Yang et al. | |
| 2016/0142898 | A1* | 5/2016 | Poitau | H04W 72/0446 370/329 |
| 2017/0078067 | A1* | 3/2017 | Sun | H04W 16/02 |
| 2017/0257202 | A1* | 9/2017 | Zhang | H04L 5/0048 |
| 2017/0280444 | A1* | 9/2017 | Da Silva | H04L 5/0048 |
| 2017/0302481 | A1* | 10/2017 | Wu | H04L 25/0204 |
| 2017/0303191 | A1* | 10/2017 | Li | H04W 48/16 |
| 2017/0325246 | A1* | 11/2017 | Agarwal | H04W 72/0406 |
| 2019/0132247 | A1* | 5/2019 | Zhang | H04L 41/08 |
| 2019/0141653 | A1* | 5/2019 | Lee | H04L 5/0091 |
| 2019/0200314 | A1* | 6/2019 | Tian | H04W 56/0035 |
| 2019/0245569 | A1* | 8/2019 | Shevchenko | H04B 1/123 |

FOREIGN PATENT DOCUMENTS

| | | |
|---|---|---|
| JP | 2014155194 A | 8/2014 |
| WO | 2014155198 A3 | 10/2014 |
| WO | 2014161142 A1 | 10/2014 |
| WO | 2015135217 A1 | 9/2015 |

OTHER PUBLICATIONS

"LAN Medium Access Control (MAC) and Physical Layer (PHY) Specifications," IEEE Std 802.11™—2012 IEEE Computer Society, IEEE Standard for Information Technology, Telecommunications and Information Exchange between Systems, Local and Metropolitan Area Networks, Specific Requirements—Amendment 3: Enhancements for Very High Throughput in the 60 GHz Band, technical report, pp. 1-2793, Institute of Electrical and Electronics Engineers—New York, New York (2012).

Choi et al.,"RF Impairment Models for 60GHz—band SYS/PHY Simulation," technical report—IEEE 802.15-06-0477-01-003c, pp. 1-16, Institute of Electrical and Electronics Engineers—New York, New York (Nov. 2006).

Erceg et al.,"60 GHz Impairments Modeling," IEEE 802.11-09/1213r1, technical report, pp. 1-29, Institute of Electrical and Electronics Engineers—New York, New York (Nov. 2009).

Perahia et al.,"IEEE P802.11 Wireless LANs TGad Evaluation Methodology," technical report—IEEE 802.11-09/0296r16, pp. 1-16, Institute of Electrical and Electronics Engineers—New York, New York (Jan. 2009).

"Radio Parameter Set for Single-Carrier Based Radio Access in Evolved UTRA Uplink," 3GPP TSG RAN WG1 Ad Hoc on LTE, Sophia Antipolis, France, R1-050588, XP050950722, 3rd Generation Partnership Project, Valbonne, France (Jun. 20-21, 2005).

"IEEE Draft Standard for Local and Metropolitan Area Networks—Part 16: Air Interface for Fixed Broadband Wireless Access Systems—Medium Access Control Modifications and Additional Physical Layer Specifications for 2-11 GHz," IEEE P802.16a/D2-2002, XP017716297, pp. 1-253, Institute of Electrical and Electronics Engineers, New York, New York (Feb. 2002).

"Air Interface for Fixed Broadband Wireless Access Systems—Part A: Systems between 2 and 11 GHz," IEEE 802.16ab-01/01r1, XP017720029, pp. 1-217, Institute of Electrical and Electronics Engineers, New York, New York (Jul. 2001).

Huemer et al., "The Potential of Unique Words in OFDM," Conference: International OFDM—Workshop, XP055688046, total 6 pages (Sep. 2010).

Yang et al., "Novel Consecutive—Pilot Design for Phase Noise Suppression in OFDM System," IEICE Trans. Fundamentals, vol. E92-A, No. 7, pp. 1704-1707, XP001547505, The Institute of Electronics, Information and Communication Engineers (Jul. 2009).

\* cited by examiner

SIGNAL TRANSMISSION METHOD AND APPARATUS

CROSS-REFERENCE TO RELATED APPLICATIONS

This application is a continuation of International Application No. PCT/CN2017/086214, filed on May 26, 2017, which claims priority to Chinese Patent Application No. 201610497100.9, filed on Jun. 29, 2016. The disclosures of the aforementioned applications are hereby incorporated by reference in their entireties.

TECHNICAL FIELD

Embodiments of the present application relate to the field of communications technologies, and in particular, to a signal transmission method and apparatus.

BACKGROUND

Over recent years, to further increase a transmission rate by using a higher bandwidth, a wireless communications system starts to use a higher frequency band. How to effectively use a frequency band of 6 GHz to 100 GHz is popular in current research. As a working frequency becomes higher, a non-ideal characteristic of a radio frequency device deteriorates. Especially, oscillators used for a transmit end and a receive end become more unstable, causing random phase rotation to a transmitted signal. Such phase rotation is referred to as a phase noise. Existence of the phase noise causes received constellation point aliasing and considerably reduces performance of a wireless communications system. Therefore, the phase noise is one of major obstacles in high frequency communication.

An amplitude of the phase noise is closely related to a range of working frequencies of the wireless communications system, a manufacturing technique of a used device, and even a working environment condition including temperature and the like. A device with a smaller phase noise requires higher hardware costs. To ensure performance of the wireless communications system, a robust phase noise suppression mechanism needs to be designed based on the working frequency, a related technological level, and a use environment. A phase noise has specific statistical characteristics due to a special nature of a simulation device. Therefore, an appropriate signal transmission scheme and processing algorithm may be designed based on these statistical characteristics, to reduce phase noise impact.

To resolve the foregoing problem, in the prior art, a single known symbol is inserted as a pilot into to-be-sent data at fixed intervals. As shown in FIG. 1, there is valid data among pilot symbols, and unique words (UW) at the beginning and the end are known sequences inserted to facilitate frequency domain equalization at a receiver. The receiver estimates phase noises at positions of the pilots by using these pilots, and estimates a phase noise at a position of the valid data among adjacent pilots by using a different method and performs compensation, to reduce a packet error rate of a system.

However, thermal noises usually exist in a communications system. The thermal noise is usually modeled into a zero mean white Gaussian complex variable, and is additively applied to a to-be-sent complex signal. Therefore, this thermal noise is also referred to as an additive white noise. As shown in the left view of FIG. 2, this additive white noise causes constellation points to evenly spread towards a real axis and an imaginary axis, and spread constellation points are distributed in a circle shape.

A phase noise caused by instability of an oscillator is a multiplicative noise. As shown in the right view of FIG. 2, a phase noise causes rotation of constellation points. Under joint effect of additive white noises and multiplicative phase noises, received spread constellation points are distributed in an elliptical shape. It can be seen from FIG. 2 that a phase noise causes overlapping of constellation points, causing a receiver to fail to perform decoding correctly and reducing significantly performance of a communications system.

It should be noted that an additive white noise also causes phase rotation of a constellation point. When a signal-to-noise ratio (SNR) is relatively low (traditionally, the noise herein is an additive white noise), an additive white noise causes relatively large phase rotation. It can be expected that in this case, an estimated phase noise value obtained by using a single pilot symbol in the prior art is inaccurate due to white noise impact, and therefore there is a relatively large error in a phase noise, predicted based on the estimated value, at a position of valid data.

SUMMARY

Embodiments of the present application provide a signal transmission method and apparatus, to improve a phase noise compensation effect for a receiver without increasing pilot overheads.

According to a first aspect, a signal transmission method includes:

obtaining, by a transmitter, a to-be-sent data block, where the to-be-sent data block includes a plurality of pieces of data;

inserting, by the transmitter, one or more pilot blocks among the plurality of pieces of data of the to-be-sent data block based on an agreed position, where the pilot block includes at least two consecutive pilot symbols; and sending, by the transmitter, the to-be-sent data block into which the one or more pilot blocks are inserted.

Inserting the one or more pilot blocks among the plurality of pieces of data of the to-be-sent data block can improve a phase noise compensation effect for a receiver without increasing pilot overheads.

With reference to the first aspect, in a first possible implementation of the first aspect, the agreed position is a position pre-agreed on by the transmitter and a receiver; or the agreed position is calculated by the transmitter according to a pre-agreed formula by using a length of the to-be-sent data block, a quantity of the pilot blocks, and a quantity of pilot symbols in the pilot block.

According to a second aspect, a signal transmission method includes:

receiving, by a receiver, a data block sent by a transmitter, where the received data block includes one or more pilot blocks, and the pilot block includes at least two consecutive pilot symbols;

determining, by the receiver, a position of the one or more pilot blocks in the received data block, and estimating a phase noise value corresponding to the position of the one or more pilot blocks in the received data block; and performing, by the receiver, phase noise compensation on a plurality of pieces of data of the received data block based on the phase noise value corresponding to the position of the one or more pilot blocks in the received data block.

Using a pilot block including a plurality of pilot symbols can improve phase noise estimation accuracy and improve a phase noise compensation effect for the receiver without increasing pilot overheads.

With reference to the second aspect, in a first possible implementation of the second aspect, the determining, by the receiver, the position of the one or more pilot blocks in the received data block includes:

determining, by the receiver, the position of the one or more pilot blocks in the received data block in a manner that is agreed on with the transmitter; or calculating, by the receiver, the position of the one or more pilot blocks in the received data block according to a pre-agreed formula by using a length of the received data block, a quantity of the pilot blocks, and a quantity of pilot symbols included in the pilot block.

With reference to the second aspect, in a second possible implementation of the second aspect, the performing, by the receiver, phase noise compensation on a plurality of pieces of data of the received data block based on the phase noise values corresponding to the position of the one or more pilot blocks in the received data block includes:

estimating, by the receiver by using an interpolation algorithm and based on the phase noise value corresponding to the position of the one or more pilot blocks in the received data block, the phase noise values corresponding to positions of the plurality of pieces of data of the received data block; and performing, by the receiver, the phase noise compensation on the plurality of pieces of data of the received data block based on the estimated phase noise values corresponding to the positions of the plurality of pieces of data of the received data block.

With reference to the second aspect, in a third possible implementation of the second aspect, the estimating, by the receiver, a phase noise value corresponding to the position of the one or more pilot blocks in the received data block includes:

estimating, by the receiver by using a weighted averaging algorithm, the phase noise value corresponding to the position of the one or more pilot blocks in the received data block.

According to a third aspect, a signal transmission method includes:

determining, by a transmitter, pilot block configuration information, where the pilot block configuration information includes pilot block configuration scheme information;

inserting, by the transmitter, one or more pilot blocks into a to-be-sent data block based on the pilot block configuration scheme information; and sending, by the transmitter, the to-be-sent data block into which the one or more pilot blocks are inserted.

The one or more pilot blocks are inserted into the to-be-sent data block based on the determined pilot block configuration information. This can implement dynamic adjustment of a size of the pilot block in the data block and a quantity of the pilot blocks in the data block, to adapt to a changing phase noise level and avoid a poor phase noise suppression effect or a waste of pilot resources. This can provide an additional means for a high-frequency communications system to deal with a non-ideal radio frequency factor, so as to improve link stability and help increase a system throughput.

With reference to the third aspect, in a first possible implementation of the third aspect, the determining, by the transmitter, the pilot block configuration information includes:

obtaining, by the transmitter, noise level information corresponding to a current time period; and determining, by the transmitter, the pilot block configuration information based on the noise level information.

With reference to the third aspect or the first possible implementation of the third aspect, in a second possible implementation of the third aspect, the obtaining, by the transmitter, the noise level information includes:

receiving, by the transmitter, the noise level information sent by a receiver; or receiving, by the transmitter, a data block sent by a receiver, and performing noise level estimation on the received data block to determine the noise level information.

With reference to the third aspect or the first possible implementation of the third aspect, in a third possible implementation of the third aspect, the noise level information includes additive white noise information and multiplicative phase noise information; and the determining, by the transmitter, the pilot block configuration information based on the noise level information includes:

if the additive white noise information is greater than additive white noise information obtained last time or the multiplicative phase noise information is less than multiplicative phase noise information obtained last time, increasing, by the transmitter, a quantity of pilot symbols included in each pilot block in the to-be-sent data block, or decreasing a quantity of the pilot blocks; or if the additive white noise information is less than additive white noise information obtained last time or the multiplicative phase noise information is greater than multiplicative phase noise information obtained last time, decreasing, by the transmitter, a quantity of pilot symbols included in each pilot block in the to-be-sent data block, or increasing a quantity of the pilot blocks.

With reference to the third aspect or the first possible implementation of the third aspect, in a fourth possible implementation of the third aspect, before the obtaining, by the transmitter, the noise level information, the method further includes:

sending, by the transmitter, a pre-agreed training sequence to a receiver, so that the receiver performs noise level estimation based on the pre-agreed training sequence.

With reference to the third aspect, in a fifth possible implementation of the third aspect, the pilot block configuration scheme information includes a number of the pilot block configuration scheme; or a quantity of the pilot blocks and a quantity of pilot symbols included in the pilot block; or an offset value of a quantity of the pilot blocks and an offset value of a quantity of pilot symbols included in the pilot block.

With reference to the third aspect or the fifth possible implementation of the third aspect, in a sixth possible implementation of the third aspect, the inserting, by the transmitter, the pilot blocks into the to-be-sent data block based on the pilot block configuration scheme information includes:

calculating, by the transmitter, a position of the pilot blocks in the to-be-sent data block according to a pre-agreed formula by using a length of the to-be-sent data block, the quantity of the pilot blocks, and the quantity of pilot symbols in the pilot block; or calculating, by the transmitter, a position of the pilot blocks according to a pre-agreed formula by using a length of the to-be-sent data block, the offset value of the quantity of the pilot blocks, the offset value of the quantity of pilot symbols included in the pilot block, and a quantity of pilot blocks and a quantity of pilot symbols included in a pilot block that are in pilot block configuration information received last time; and inserting, by the transmitter, the one or more pilot blocks into the to-be-sent data block based on the position of the pilot blocks.

With reference to the third aspect, in a seventh possible implementation of the third aspect, after the determining, by a transmitter, pilot block configuration information, the method further includes:

sending, by the transmitter, the pilot block configuration information to a receiver; or setting, by the transmitter, the pilot block to a preset sequence or a modulation constellation diagram based on the pilot block configuration information.

According to a fourth aspect, a signal transmission method includes:

receiving, by a receiver, a first data block sent by a transmitter;

determining, by the receiver, pilot block configuration information, where the pilot block configuration information includes pilot block configuration scheme information;

estimating, by the receiver based on the pilot block configuration scheme information, a phase noise value corresponding to a position of one or more pilot blocks in the first data block; and performing, by the receiver, phase noise compensation on a plurality of pieces of data of the first data block based on the phase noise value corresponding to the position of the one or more pilot blocks in the first data block.

The phase noise value corresponding to the position of the one or more pilot blocks in the first data block is estimated based on the determined pilot block configuration information, so as to adapt to a changing phase noise level and avoid a poor phase noise suppression effect or a waste of pilot resources. This can provide an additional means for a high-frequency communications system to deal with a non-ideal radio frequency factor, so as to improve link stability and help increase a system throughput.

With reference to the fourth aspect, in a first possible implementation of the fourth aspect, before the receiving, by the receiver, the first data block sent by the transmitter and the pilot block configuration information in the first data block, the method further includes:

receiving, by a receiver, a second data block sent by a transmitter;

performing, by the receiver, demodulation and noise level estimation on the second data block to obtain noise level information of the second data block; and sending, by the receiver, the noise level information to the transmitter.

With reference to the fourth aspect or the first possible implementation of the fourth aspect, in a second possible implementation of the fourth aspect, the performing, by the receiver, the noise level estimation on the second data block includes:

if the second data block is a pre-agreed training sequence, performing, by the receiver, the noise level estimation by using the received second data block; or if the second data block is unknown data, performing, by the receiver, noise level estimation on the second data block based on a to-be-sent data block that is reconstructed after soft or hard decision decoding and the second data block.

With reference to the fourth aspect, in a third possible implementation of the fourth aspect, the pilot block configuration scheme information includes a number of the pilot block configuration scheme; or a quantity of the pilot blocks and a quantity of pilot symbols included in the pilot block; or an offset value of a quantity of the pilot blocks and an offset value of a quantity of pilot symbols included in the pilot block.

With reference to the fourth aspect or the third possible implementation of the fourth aspect, in a fourth possible implementation of the fourth aspect, the estimating, by the receiver based on the pilot block configuration scheme information, the phase noise value corresponding to the position of one or more pilot blocks in the first data block includes:

if the pilot block configuration scheme information includes the quantity of the pilot blocks and the quantity of pilot symbols included in the pilot block, calculating, by the receiver, the position of the pilot blocks in the first data block according to a pre-agreed formula by using a length of the first data block, the quantity of the pilot blocks, and the quantity of pilot symbols in the pilot block; and estimating a phase noise level corresponding to the position of the one or more pilot blocks; or if the pilot block configuration scheme information includes the offset value of the quantity of the pilot blocks and the offset value of the quantity of pilot symbols included in the pilot block, calculating, by the receiver, the position of the pilot blocks in the first data block according to a pre-agreed formula by using a length of the first data block, the offset value of the quantity of the pilot blocks, the offset value of the quantity of pilot symbols included in the pilot block, and a quantity of pilot blocks and a quantity of pilot symbols included in a pilot block that are in pilot block configuration information received last time; and estimating a phase noise level corresponding to the position of the one or more pilot blocks.

With reference to the fourth aspect, in a fifth possible implementation of the fourth aspect, the determining, by the receiver, pilot block configuration information includes:

obtaining, by the receiver, the pilot block configuration information sent by the transmitter; or determining, by the receiver, the pilot block configuration information based on a preset sequence or a modulation constellation diagram in the first data block.

According to a fifth aspect, a signal transmission apparatus includes:

a processing unit, configured to: obtain a to-be-sent data block, where the to-be-sent data block includes a plurality of pieces of data; and insert one or more pilot blocks among the plurality of pieces of data of the to-be-sent data block based on an agreed position, where the pilot block includes at least two consecutive pilot symbols; and a sending unit, configured to send the to-be-sent data block into which the one or more pilot blocks are inserted by the processing unit.

Inserting the one or more pilot blocks among the plurality of pieces of data of the to-be-sent data block can improve a phase noise compensation effect for a receiver without increasing pilot overheads.

With reference to the fifth aspect, in a first possible implementation of the fifth aspect, the agreed position is a position pre-agreed on by a transmitter and a receiver; or the agreed position is calculated by a transmitter according to a pre-agreed formula by using a length of the to-be-sent data block, a quantity of the pilot blocks, and a quantity of pilot symbols in the pilot block.

According to a sixth aspect, a signal transmission apparatus includes:

a receiving unit, configured to receive a data block sent by a transmitter, where the received data block includes one or more pilot blocks, and the pilot block includes at least two consecutive pilot symbols; and a processing unit, configured to: determine a position of the one or more pilot blocks in the data block received by the receiving unit, estimate a phase noise value corresponding to the position of the one or more pilot blocks in the received data block, and perform phase noise compensation on a plurality of pieces of data of the received data block based on the phase noise value corresponding to the position of the one or more pilot blocks in the received data block.

Using a pilot block including a plurality of pilot symbols can improve phase noise estimation accuracy and improve a phase noise compensation effect for a receiver without increasing pilot overheads.

With reference to the sixth aspect, in a first possible implementation of the sixth aspect, the processing unit is specifically configured to:

determine the position of the one or more pilot blocks in the received data block in a manner that is agreed on with the transmitter; or calculate the position of the one or more pilot blocks in the received data block according to a pre-agreed formula by using a length of the received data block, a quantity of the pilot blocks, and a quantity of pilot symbols included in the pilot block.

With reference to the sixth aspect, in a second possible implementation of the sixth aspect, the processing unit is specifically configured to:

estimate, by using an interpolation algorithm and based on the phase noise value corresponding to the position of the one or more pilot blocks in the received data block, phase noise values corresponding to positions of the plurality of pieces of data of the received data block; and perform phase noise compensation on the plurality of pieces of data of the received data block based on the estimated phase noise values corresponding to the positions of the plurality of pieces of data of the received data block.

With reference to the sixth aspect, in a third possible implementation of the sixth aspect, the processing unit is specifically configured to:

estimate, by using a weighted averaging algorithm, the phase noise value corresponding to the position of the one or more pilot blocks in the received data block.

According to a seventh aspect, a signal transmission apparatus includes:

a processing unit, configured to: determine pilot block configuration information, where the pilot block configuration information includes pilot block configuration scheme information; and insert one or more pilot blocks into a to-be-sent data block based on the pilot block configuration scheme information; and a sending unit, configured to send the to-be-sent data block into which the one or more pilot blocks are inserted by the processing unit.

The one or more pilot blocks are inserted into the to-be-sent data block based on the determined pilot block configuration information. This can implement dynamic adjustment of a size of the pilot block in the data block and a quantity of the pilot blocks in the data block, to adapt to a changing phase noise level and avoid a poor phase noise suppression effect or a waste of pilot resources. This can provide an additional means for a high-frequency communications system to deal with a non-ideal radio frequency factor, so as to improve link stability and help increase a system throughput.

With reference to the seventh aspect, in a first possible implementation of the seventh aspect, the processing unit is specifically configured to:

obtain noise level information corresponding to a current time period; and determine the pilot block configuration information based on the noise level information.

With reference to the seventh aspect or the first possible implementation of the seventh aspect, in a second possible implementation of the seventh aspect, the apparatus further includes a receiving unit, where the receiving unit is configured to receive noise level information sent by a receiver; or the receiving unit is configured to receive a data block sent by a receiver, and the processing unit is further configured to perform noise level estimation on the data block received by the receiving unit, to determine the noise level information.

With reference to the seventh aspect or the first possible implementation of the seventh aspect, in a third possible implementation of the seventh aspect, the noise level information includes additive white noise information and multiplicative phase noise information; and the processing unit is specifically configured to:

if the additive white noise information is greater than additive white noise information obtained last time or the multiplicative phase noise information is less than multiplicative phase noise information obtained last time, increase a quantity of pilot symbols included in each pilot block in the to-be-sent data block, or decrease a quantity of the pilot blocks; or if the additive white noise information is less than additive white noise information obtained last time or the multiplicative phase noise information is greater than multiplicative phase noise information obtained last time, decrease a quantity of pilot symbols included in each pilot block in the to-be-sent data block, or increase a quantity of the pilot blocks.

With reference to the seventh aspect or the first possible implementation of the seventh aspect, in a fourth possible implementation of the seventh aspect, the sending unit is further configured to:

before the noise level information is obtained, send a pre-agreed training sequence to a receiver, so that the receiver performs noise level estimation based on the pre-agreed training sequence.

With reference to the seventh aspect, in a fifth possible implementation of the seventh aspect, the pilot block configuration scheme information includes a number of the pilot block configuration scheme; or a quantity of the pilot blocks and a quantity of pilot symbols included in the pilot block; or an offset value of a quantity of the pilot blocks and an offset value of a quantity of pilot symbols included in the pilot block.

With reference to the seventh aspect or the fifth possible implementation of the seventh aspect, in a sixth possible implementation of the seventh aspect, the processing unit is specifically configured to:

calculate a position of the pilot blocks in the to-be-sent data block according to a pre-agreed formula by using a length of the to-be-sent data block, the quantity of the pilot blocks, and the quantity of pilot symbols in the pilot block; or calculate a position of the pilot blocks according to a pre-agreed formula by using a length of the to-be-sent data block, the offset value of the quantity of the pilot blocks, the offset value of the quantity of pilot symbols included in the pilot block, and a quantity of pilot blocks and a quantity of pilot symbols included in a pilot block that are in pilot block configuration information received last time; and insert the one or more pilot blocks into the to-be-sent data block based on the position of the pilot blocks.

With reference to the seventh aspect, in a seventh possible implementation of the seventh aspect, after the pilot block configuration information is determined, the sending unit is further configured to send the pilot block configuration information to a receiver; or the processing unit is further configured to set the pilot block to a preset sequence or a modulation constellation diagram based on the pilot block configuration information.

According to an eighth aspect, a signal transmission apparatus includes:

a receiving unit, configured to receive a first data block sent by a transmitter; and a processing unit, configured to: determine pilot block configuration information, where the pilot block configuration information includes pilot block configuration scheme information; estimate, based on the pilot block configuration scheme information, a phase noise value corresponding to a position of one or more pilot blocks in the first data block; and perform phase noise compensation on a plurality of pieces of data of the first data block based on the phase noise value corresponding to the position of the one or more pilot blocks in the first data block.

The one or more pilot blocks are inserted into a to-be-sent data block based on the determined pilot block configuration information. This can implement dynamic adjustment of a size of the pilot block in the data block and a quantity of the pilot blocks in the data block, to adapt to a changing phase noise level and avoid a poor phase noise suppression effect or a waste of pilot resources. This can provide an additional means for a high-frequency communications system to deal with a non-ideal radio frequency factor, so as to improve link stability and help increase a system throughput.

With reference to the eighth aspect, in a first possible implementation of the eighth aspect, the apparatus further includes a sending unit, where before receiving the first data block sent by the transmitter and the pilot block configuration information in the first data block, the receiving unit is further configured to receive a second data block sent by the transmitter;

the processing unit is further configured to perform demodulation and noise level estimation on the second data block to obtain noise level information of the second data block; and the sending unit is configured to send the noise level information to the transmitter.

With reference to the eighth aspect or the first possible implementation of the eighth aspect, in a second possible implementation of the eighth aspect, the processing unit is specifically configured to:

if the second data block is a pre-agreed training sequence, perform noise level estimation by using the received second data block; or if the second data block is unknown data, perform noise level estimation on the second data block based on a to-be-sent data block that is reconstructed after soft or hard decision decoding and the second data block.

With reference to the eighth aspect, in a third possible implementation of the eighth aspect, the pilot block configuration scheme information includes a number of the pilot block configuration scheme; or a quantity of the pilot blocks and a quantity of pilot symbols included in the pilot block; or an offset value of a quantity of the pilot blocks and an offset value of a quantity of pilot symbols included in the pilot block.

With reference to the eighth aspect or the third possible implementation of the eighth aspect, in a fourth possible implementation of the eighth aspect, the processing unit is specifically configured to:

if the pilot block configuration scheme information includes the quantity of the pilot blocks and the quantity of pilot symbols included in the pilot block, calculate the position of the pilot blocks in the first data block according to a pre-agreed formula by using a length of the first data block, the quantity of the pilot blocks, and the quantity of pilot symbols in the pilot block; and estimate a phase noise level corresponding to the position of the one or more pilot blocks; or if the pilot block configuration scheme information includes the offset value of the quantity of the pilot blocks and the offset value of the quantity of pilot symbols included in the pilot block, calculate the position of the pilot blocks in the first data block according to a pre-agreed formula by using a length of the first data block, the offset value of the quantity of the pilot blocks, the offset value of the quantity of pilot symbols included in the pilot block, and a quantity of pilot blocks and a quantity of pilot symbols included in a pilot block that are in pilot block configuration information received last time; and estimate a phase noise level corresponding to the position of the one or more pilot blocks.

With reference to the eighth aspect, in a fifth possible implementation of the eighth aspect, the processing unit is specifically configured to:

obtain pilot block configuration information sent by the transmitter; or determine the pilot block configuration information based on a preset sequence or a modulation constellation diagram in the first data block.

According to a ninth aspect, a signal transmission apparatus includes:

a transceiver, a processor, and a memory, where the transceiver is configured to obtain a to-be-sent data block, where the to-be-sent data block includes a plurality of pieces of data; the processor is configured to insert, based on an agreed position, one or more pilot blocks between the plurality of pieces of data of the to-be-sent data block obtained by the transceiver, where the pilot block includes at least two consecutive pilot symbols; and the transceiver sends the to-be-sent data block into which the one or more pilot blocks are inserted by the processor.

With reference to the ninth aspect, in a first possible implementation of the ninth aspect, the agreed position is a position pre-agreed on by a transmitter and a receiver; or the agreed position is calculated by a transmitter according to a pre-agreed formula by using a length of the to-be-sent data block, a quantity of the pilot blocks, and a quantity of pilot symbols in the pilot block.

According to a tenth aspect, a signal transmission apparatus includes:

a transceiver, a processor, and a memory, where the transceiver receives a data block sent by a transmitter, where the received data block includes one or more pilot blocks, and the pilot block includes at least two consecutive pilot symbols; and the processor is configured to read code in the memory to perform the following operations: determining a position of the one or more pilot blocks in the data block received by the receiving unit, estimating a phase noise value corresponding to the position of the one or more pilot blocks in the received data block, and performing phase noise compensation on a plurality of pieces of data of the received data block based on the phase noise value corresponding to the position of the one or more pilot blocks in the received data block.

With reference to the tenth aspect, in a first possible implementation of the tenth aspect, the processor determines the position of the one or more pilot blocks in the received data block in a manner that is agreed on with the transmitter; or the processor calculates the position of the one or more pilot blocks in the received data block according to a pre-agreed formula by using a length of the received data block, a quantity of the pilot blocks, and a quantity of pilot symbols included in the pilot block.

With reference to the tenth aspect, in a second possible implementation of the tenth aspect, the processor estimates, by using an interpolation algorithm and based on the phase noise value corresponding to the position of the one or more pilot blocks in the received data block, phase noise values corresponding to positions of the plurality of pieces of data of the received data block; and the processor performs phase noise compensation on the plurality of pieces of data of the received data block based on the estimated phase noise values corresponding to the positions of the plurality of pieces of data of the received data block.

With reference to the tenth aspect, in a third possible implementation of the tenth aspect, the processor estimates, by using a weighted averaging algorithm, the phase noise value corresponding to the position of the one or more pilot blocks in the received data block.

According to an eleventh aspect, a signal transmission apparatus includes:

a transceiver, a processor, and a memory, where the processor is configured to read code in the memory to perform the following operations: determining pilot block configuration information, where the pilot block configuration information includes pilot block configuration scheme information; and inserting one or more pilot blocks into a to-be-sent data block based on the pilot block configuration scheme information; and the transceiver sends the to-be-sent data block into which the one or more pilot blocks are inserted by the processor.

With reference to the eleventh aspect, in a first possible implementation of the eleventh aspect, the processor obtains noise level information corresponding to a current time period; and determines the pilot block configuration information based on the noise level information.

With reference to the eleventh aspect or the first possible implementation of the eleventh aspect, in a second possible implementation of the eleventh aspect, the transceiver receives noise level information sent by a receiver; or the transceiver receives a data block sent by a receiver, and the processor performs noise level estimation on the data block received by the transceiver, to determine the noise level information.

With reference to the eleventh aspect or the first possible implementation of the eleventh aspect, in a third possible implementation of the eleventh aspect, the noise level information includes additive white noise information and multiplicative phase noise information; and if the additive white noise information is greater than additive white noise information obtained last time or the multiplicative phase noise information is less than multiplicative phase noise information obtained last time, the processor increases a quantity of pilot symbols included in each pilot block in the to-be-sent data block, or decreases a quantity of the pilot blocks; or if the additive white noise information is less than additive white noise information obtained last time or the multiplicative phase noise information is greater than multiplicative phase noise information obtained last time, the processor decreases a quantity of pilot symbols included in each pilot block in the to-be-sent data block, or increases a quantity of the pilot blocks.

With reference to the eleventh aspect or the first possible implementation of the eleventh aspect, in a fourth possible implementation of the eleventh aspect, before the noise level information is obtained, the transceiver sends a pre-agreed training sequence to a receiver, so that the receiver performs noise level estimation based on the pre-agreed training sequence.

With reference to the eleventh aspect, in a fifth possible implementation of the eleventh aspect, the pilot block configuration scheme information includes a number of the pilot block configuration scheme; or a quantity of the pilot blocks and a quantity of pilot symbols included in the pilot block; or an offset value of a quantity of the pilot blocks and an offset value of a quantity of pilot symbols included in the pilot block.

With reference to the eleventh aspect or the fifth possible implementation of the eleventh aspect, in a sixth possible implementation of the eleventh aspect, the processor calculates a position of the pilot blocks in the data block according to a pre-agreed formula by using a length of the to-be-sent data block, the quantity of the pilot blocks, and the quantity of pilot symbols in the pilot block; or the processor calculates a position of the pilot blocks according to a pre-agreed formula by using a length of the to-be-sent data block, the offset value of the quantity of the pilot blocks, the offset value of the quantity of pilot symbols included in the pilot block, and a quantity of pilot blocks and a quantity of pilot symbols included in a pilot block that are in pilot block configuration information received last time; and inserts the one or more pilot blocks into the to-be-sent data block based on the position of the pilot blocks.

With reference to the eleventh aspect, in a seventh possible implementation of the eleventh aspect, after the pilot block configuration information is determined, the transceiver sends the pilot block configuration information to a receiver; or the processor sets the pilot block to a preset sequence or a modulation constellation diagram based on the pilot block configuration information.

According to a twelfth aspect, a signal transmission apparatus includes:

a transceiver, a processor, and a memory, where the transceiver receives a first data block sent by a transmitter; and the processor is configured to read code in the memory to perform the following operations: determining pilot block configuration information, where the pilot block configuration information includes pilot block configuration scheme information; estimating, based on the pilot block configuration scheme information, a phase noise value corresponding to a position of one or more pilot blocks in the first data block; and performing phase noise compensation on a plurality of pieces of data of the first data block based on the phase noise value corresponding to the position of the one or more pilot blocks in the first data block.

With reference to the twelfth aspect, in a first possible implementation of the twelfth aspect, before receiving the first data block sent by the transmitter and the pilot block configuration information in the first data block, the transceiver receives a second data block sent by the transmitter; the processor performs demodulation and noise level estimation on the second data block to obtain noise level information of the second data block; and the transceiver sends the noise level information to the transmitter.

With reference to the twelfth aspect or the first possible implementation of the twelfth aspect, in a second possible implementation of the twelfth aspect, if the second data block is a pre-agreed training sequence, the processor performs noise level estimation by using the received second data block; or if the second data block is unknown data, the processor performs noise level estimation on the second data block based on a to-be-sent data block that is reconstructed after soft or hard decision decoding and the second data block.

With reference to the twelfth aspect, in a third possible implementation of the twelfth aspect, the pilot block configuration scheme information includes a number of the pilot block configuration scheme; or a quantity of the pilot blocks and a quantity of pilot symbols included in the pilot block; or an offset value of a quantity of the pilot blocks and an offset value of a quantity of pilot symbols included in the pilot block.

With reference to the twelfth aspect or the third possible implementation of the twelfth aspect, in a fourth possible implementation of the twelfth aspect, if the pilot block configuration scheme information includes the quantity of the pilot blocks and the quantity of pilot symbols included in the pilot block, the processor calculates the position of the pilot blocks in the first data block according to a pre-agreed formula by using a length of the first data block, the quantity of the pilot blocks, and the quantity of pilot symbols in the pilot block; and estimates a phase noise level corresponding to the position of the one or more pilot blocks; or if the pilot block configuration scheme information includes the offset value of the quantity of the pilot blocks and the offset value of the quantity of pilot symbols included in the pilot block, the processor calculates the position of the pilot blocks in the first data block according to a pre-agreed formula by using a length of the first data block, the offset value of the quantity of the pilot blocks, the offset value of the quantity of pilot symbols included in the pilot block, and a quantity of pilot blocks and a quantity of pilot symbols included in a pilot block that are in pilot block configuration information received last time; and estimates a phase noise level corresponding to the position of the one or more pilot blocks.

With reference to the twelfth aspect, in a fifth possible implementation of the twelfth aspect, the processor obtains pilot block configuration information sent by the transmitter; or the processor determines the pilot block configuration information based on a preset sequence or a modulation constellation diagram in the first data block.

According to a thirteenth aspect, a computer storage medium is provided and is configured to store a computer software instruction executed by the processor in the ninth aspect to perform the method provided in the first aspect.

According to a fourteenth aspect, a computer storage medium is provided and is configured to store a computer software instruction executed by the processor in the tenth aspect to perform the method provided in the second aspect.

According to a fifteenth aspect, a computer storage medium is provided and is configured to store a computer software instruction executed by the processor in the eleventh aspect to perform the method provided in the third aspect.

According to a sixteenth aspect, a computer storage medium is provided and is configured to store a computer software instruction executed by the processor in the twelfth aspect to perform the method provided in the fourth aspect.

According to a seventeenth aspect, a signal transmission apparatus is provided, including:

a transceiver, a processor, and a memory, where the processor is configured to read code in the memory to perform the method provided in the first aspect or the possible implementation of the first aspect.

According to an eighteenth aspect, a signal transmission apparatus is provided, including:

a transceiver, a processor, and a memory, where the processor is configured to read code in the memory to perform the method provided in any one of the second aspect or the possible implementations of the second aspect.

According to a nineteenth aspect, a signal transmission apparatus is provided, including:

a transceiver, a processor, and a memory, where the processor is configured to read code in the memory to perform the method provided in any one of the third aspect or the possible implementations of the third aspect.

According to a twentieth aspect, a signal transmission apparatus is provided, including:

a transceiver, a processor, and a memory, where the processor is configured to read code in the memory to perform the method provided in any one of the fourth aspect or the possible implementations of the fourth aspect.

According to the embodiments of the present application, the transmitter obtains the to-be-sent data block, inserts the one or more pilot blocks among the plurality of pieces of data of the to-be-sent data block based on the agreed position, and sends the to-be-sent data block into which the one or more pilot blocks are inserted. Inserting the one or more pilot blocks among the plurality of pieces of data of the to-be-sent data block can improve a phase noise compensation effect for the receiver without increasing pilot overheads.

BRIEF DESCRIPTION OF DRAWINGS

To describe the technical solutions in the embodiments of the present application more clearly, the following briefly describes the accompanying drawings required for describing the embodiments.

DESCRIPTION OF EMBODIMENTS

To make the objectives, technical solutions, and advantages of the present application clearer, the following further describes the present application in detail with reference to the accompanying drawings.

Figure 1:
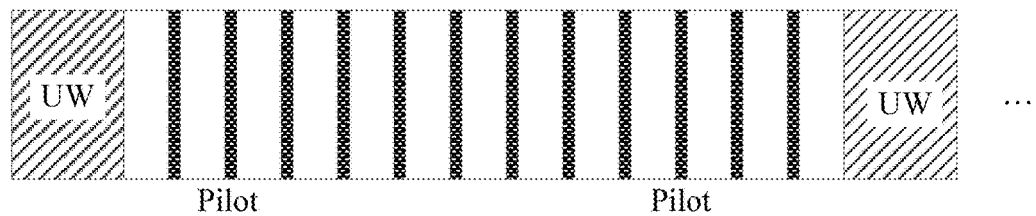
FIG. 1 is a schematic structural diagram of a data block according to the prior art.
Figure 2:
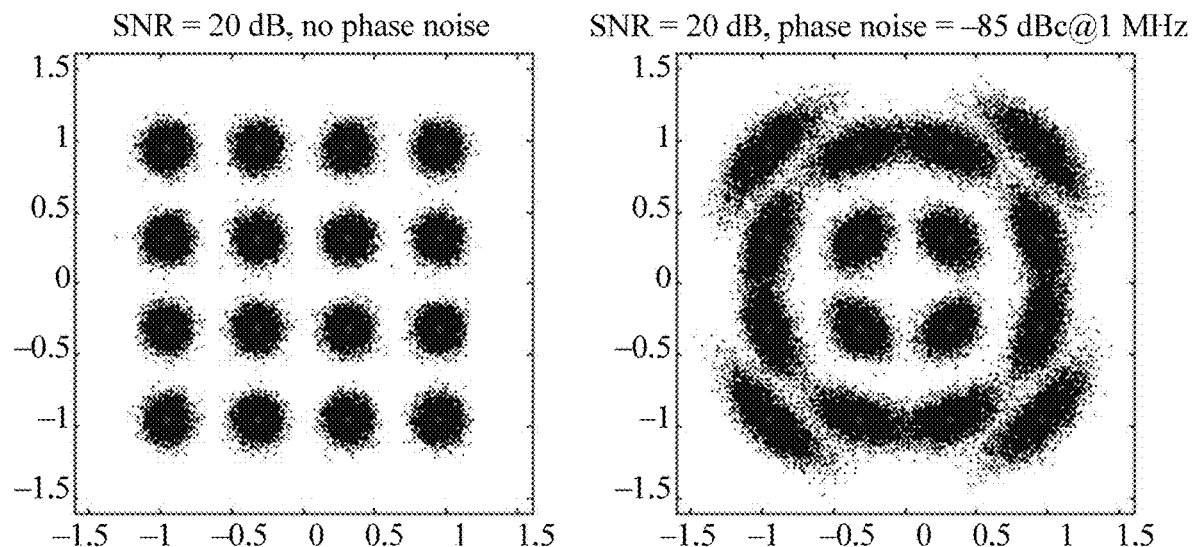
FIG. 2 is a schematic diagram of a noise constellation point according to the prior art.
Figure 3:
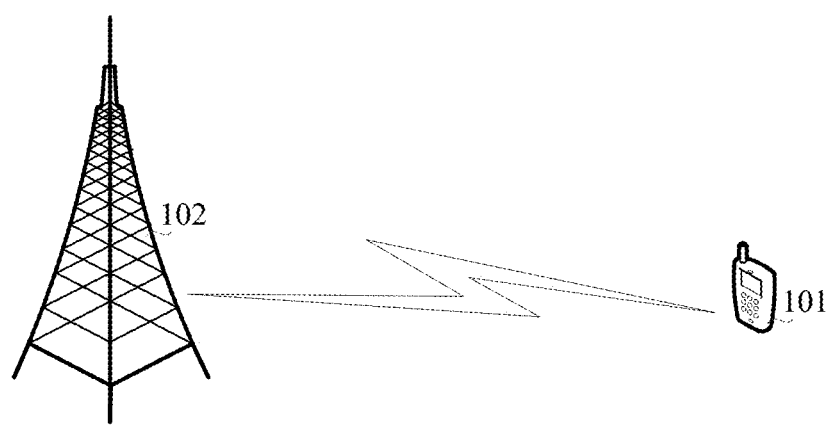
FIG. 3 is a schematic diagram of a system architecture according to an embodiment of the present application.

FIG. 3 shows a system architecture to which the embodiments of the present application are applicable. Signal transmission control can be implemented based on the system architecture. The system architecture for signal transmission provided in an embodiment of the present application includes a terminal 101 and a base station 102.

The terminal 101 may be a device that provides voice and/or data connectivity for a user, including a wireless terminal or a wired terminal. The wireless terminal may be a handheld device with a wireless connection function, another processing device connected to a wireless modem, or a mobile terminal that communicates with one or more core networks by using a radio access network. For example, the wireless terminal may be a mobile phone (also referred to as a "cellular" phone) and a computer with a mobile terminal. For another example, the wireless terminal may be a portable, pocket-sized, handheld, computer built-in, or in-vehicle mobile device. For still another example, the wireless terminal may be a part of a mobile station, an access point, or user equipment (UE). The base station 102 in this embodiment of the present application includes but is not limited to a node, a station controller, an access point (AP), or any other type of interface device that can work in a wireless environment.

The terminal 101 may perform wireless communication with the base station 102. The terminal 101 and the base station 102 each include a transmitter and a receiver, and perform signal transmission by sending a signal through the transmitter and receiving information through the receiver.

When performing information transmission with the base station 102, the terminal 101 usually inserts a single-point pilot into a to-be-sent data block to estimate a phase noise value of the single-point pilot, so as to implement phase noise compensation for limited data. An additive white noise also causes phase rotation of a constellation point. Therefore, when a signal-to-noise ratio is relatively low, the additive white noise causes relatively large phase rotation. An estimated phase noise value obtained by using a single-point pilot in the prior art is inaccurate due to white noise impact.

Figure 4:
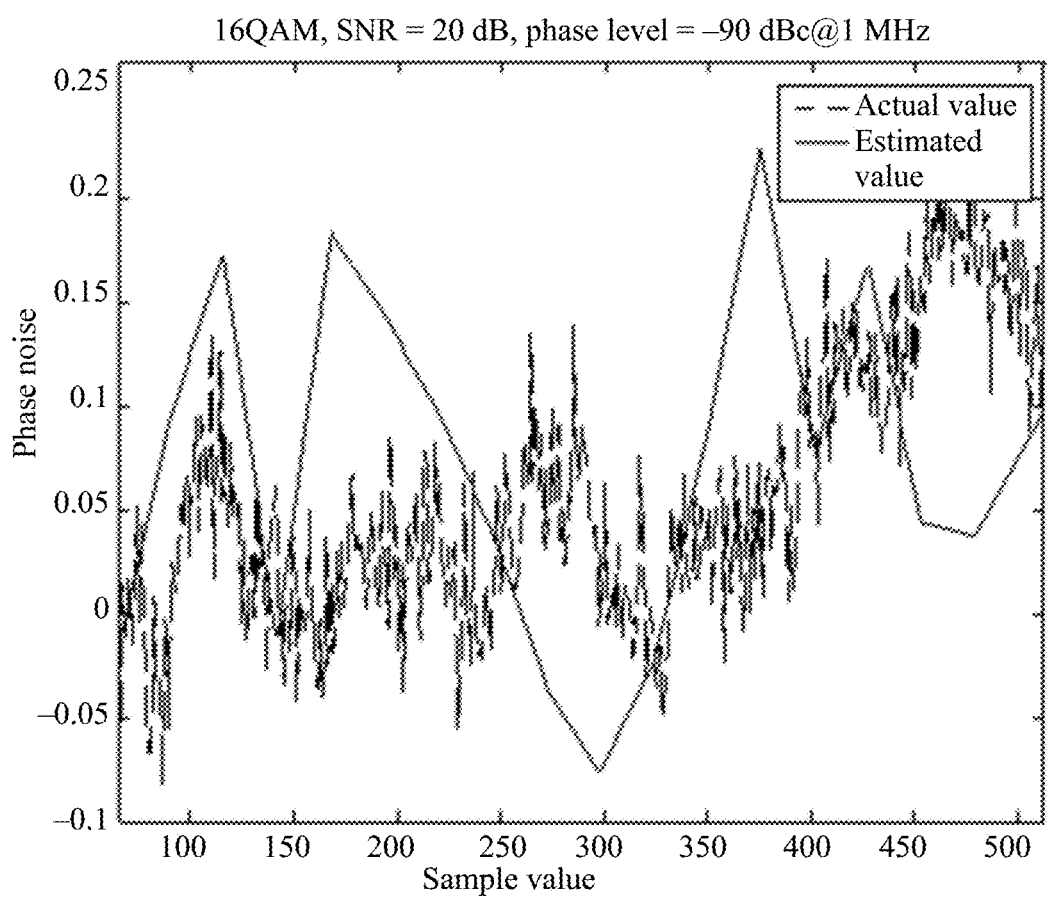
FIG. 4 is a schematic diagram of simulated data according to an embodiment of the present application.

As shown in FIG. 4, a dashed line represents a value of a phase noise actually added in simulation, a solid line represents an estimated phase noise value obtained through single-point pilot estimation and fitting in the prior art, and there is a great difference between the two values. It can be learned that when a signal-to-noise ratio is relatively low and an additive noise is obvious, accurate phase noise estimation and compensation cannot be performed accurately by using a single-point pilot.

Figure 5:
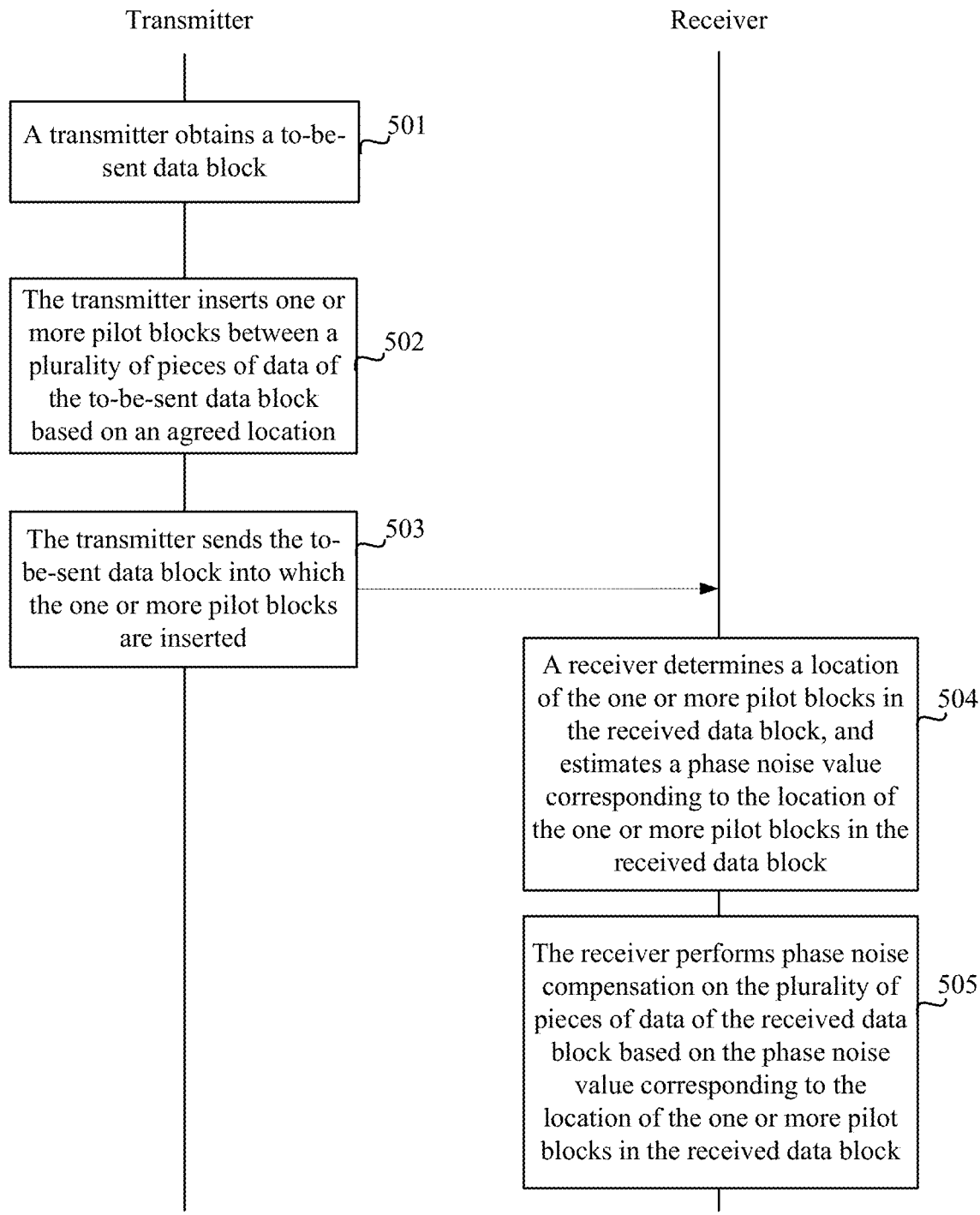
FIG. 5 is a schematic flowchart of a signal transmission method according to an embodiment of the present application.

Based on the foregoing description, to resolve the problem existing in the prior art, FIG. 5 shows an example procedure of a signal transmission method according to an embodiment of the present application. The procedure may be performed by a signal transmission apparatus, and the apparatus may be a base station or a terminal.

As shown in FIG. 5, the procedure specifically includes the following steps:

Step 501. A transmitter obtains a to-be-sent data block.

Step 502. The transmitter inserts one or more pilot blocks among a plurality of pieces of data of the to-be-sent data block based on an agreed position.

Step 503. The transmitter sends, to a receiver, the to-be-sent data block into which the one or more pilot blocks are inserted.

Step 504. The receiver determines a position of the one or more pilot blocks in the received data block, and estimates a phase noise value corresponding to the position of the one or more pilot blocks in the received data block.

Step 505. The receiver performs phase noise compensation on the plurality of pieces of data of the received data block based on the phase noise value corresponding to the position of the one or more pilot blocks in the received data block.

Figure 6:
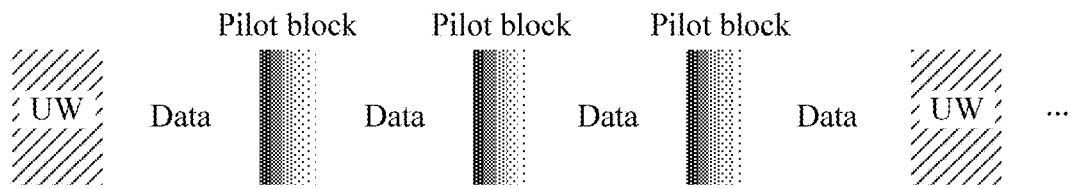
FIG. 6 is a schematic structural diagram of a data block according to an embodiment of the present application.

In this embodiment of the present application, the to-be-sent data block includes a plurality of pieces of data, to be specific, a plurality of pieces of valid data. The transmitter inserts the one or more pilot blocks among the plurality of pieces of data of the to-be-sent data block based on the agreed position. The pilot block includes at least two consecutive pilot symbols. For example, each data block includes L pieces of data, J pilot blocks are inserted among the L pieces of data, each pilot block includes K pilot symbols, and K is an integer greater than 1. In addition, a unique word (0) of a length M is added to a header of each data block. After the unique word is added, each data block has a length of N=L+J*K+M. A UW sequence of a length M is used to form an equivalent cyclic prefix, so that the receiver can eliminate multipath channel impact by using low-complexity frequency domain equalization in processing. In a common communications system, N is usually a given value and is usually an integer power of two; and M is determined based on an effective delay length of a multipath channel and an up-sampling multiple of the communications system, and is also usually a fixed value. FIG. 6 is a schematic diagram of a to-be-sent data block into which pilots and a unique word are inserted. The to-be-sent data block includes three pilot blocks, and each pilot block includes five consecutive pilot symbols. The transmitter performs up-sampling and shaping filtering on a formed data stream to limit out-of-band leakage in frequency domain, and then sends a filtered signal on an intermediate radio frequency link.

The agreed position may be a position pre-agreed on by the transmitter and the receiver, to be specific, may be directly specified by a communications protocol. The agreed position may be alternatively calculated by the transmitter according to a pre-agreed formula by using a length of the to-be-sent data block, a quantity of the pilot blocks, and a quantity of pilot symbols in the pilot block. For example, a calculation formula may be provided, to determine a position of each pilot in the data block based on a data block length N, a unique-word length M, a valid-data length L, a quantity J of pilot blocks, and a quantity K of symbol points in the pilot block.

The data block received by the receiver includes the one or more pilot blocks. For a structure of the received data block, refer to FIG. 6. The pilot block includes a plurality of consecutive pilot symbols.

After receiving the data block sent by the transmitter, the receiver first performs receiver filtering and down-sampling on the received data block, and then performs channel equalization on limited data on a block basis to eliminate multipath channel impact.

The determining, by the receiver, a position of the one or more pilot blocks in the received data block is specifically: determining, by the receiver, the position of the one or more pilot blocks in the received data block based on a manner that is agreed on with the transmitter; or calculating, by the receiver, the position of the one or more pilot blocks in the received data block according to a pre-agreed formula by using a length of the received data block, a quantity of the pilot blocks, and a quantity of pilot symbols included in the pilot block.

After determining the position of the one or more pilot blocks in the received data block, the receiver estimates, by using an interpolation algorithm and based on the phase noise value corresponding to the position of the one or more pilot blocks in the received data block, phase noise values corresponding to positions of the plurality of pieces of data of the received data block; and then the receiver may perform phase noise compensation on the plurality of pieces of data of the received data block based on the estimated phase noise values corresponding to the positions of the plurality of pieces of data of the received data block, to improve reliability of subsequent signal demodulation.

When estimating the phase noise value corresponding to the position of the one or more pilot blocks in the received data block, the receiver may estimate, by using a weighted averaging algorithm, the phase noise value corresponding to the position of the one or more pilot blocks in the received data block, to reduce impact of an additive white noise. This embodiment of the present application is merely an example. No limitation is set on an algorithm used to estimate the phase noise value corresponding to the position of the one or more pilot blocks in the received data block.

According to the foregoing embodiment, the transmitter obtains the to-be-sent data block, inserts the one or more pilot blocks among the plurality of pieces of data of the to-be-sent data block based on the agreed position, and sends the to-be-sent data block into which the one or more pilot blocks are inserted. Inserting the one or more pilot blocks among the plurality of pieces of data of the to-be-sent data block can improve a phase noise compensation effect for the receiver without increasing pilot overheads.

According to the foregoing embodiment, the receiver receives the data block sent by the transmitter, determines the position of the one or more pilot blocks in the received data block, estimates the phase noise value corresponding to the position of the one or more pilot blocks in the received data block, and performs phase noise compensation on the plurality of pieces of data of the received data block based on the phase noise value corresponding to the position of the one or more pilot blocks in the received data block. Using a pilot block including a plurality of pilot symbols can improve phase noise estimation accuracy and improve a phase noise compensation effect for the receiver without increasing pilot overheads.

The foregoing embodiment of the present application proposes that a pilot block including a plurality of pilot symbols should be used for phase noise estimation. When phase noise estimation is performed by using a pilot block, impact of an additive white noise and a high frequency component of a phase noise can be effectively reduced through weighted averaging, to accurately track a low frequency envelope of the phase noise. Impact of a phase noise on system performance can be effectively suppressed by performing estimation and compensation on a phase noise in a data symbol among the pilot blocks by using estimated phase noise values of a plurality of pilot blocks.

Figure 7:
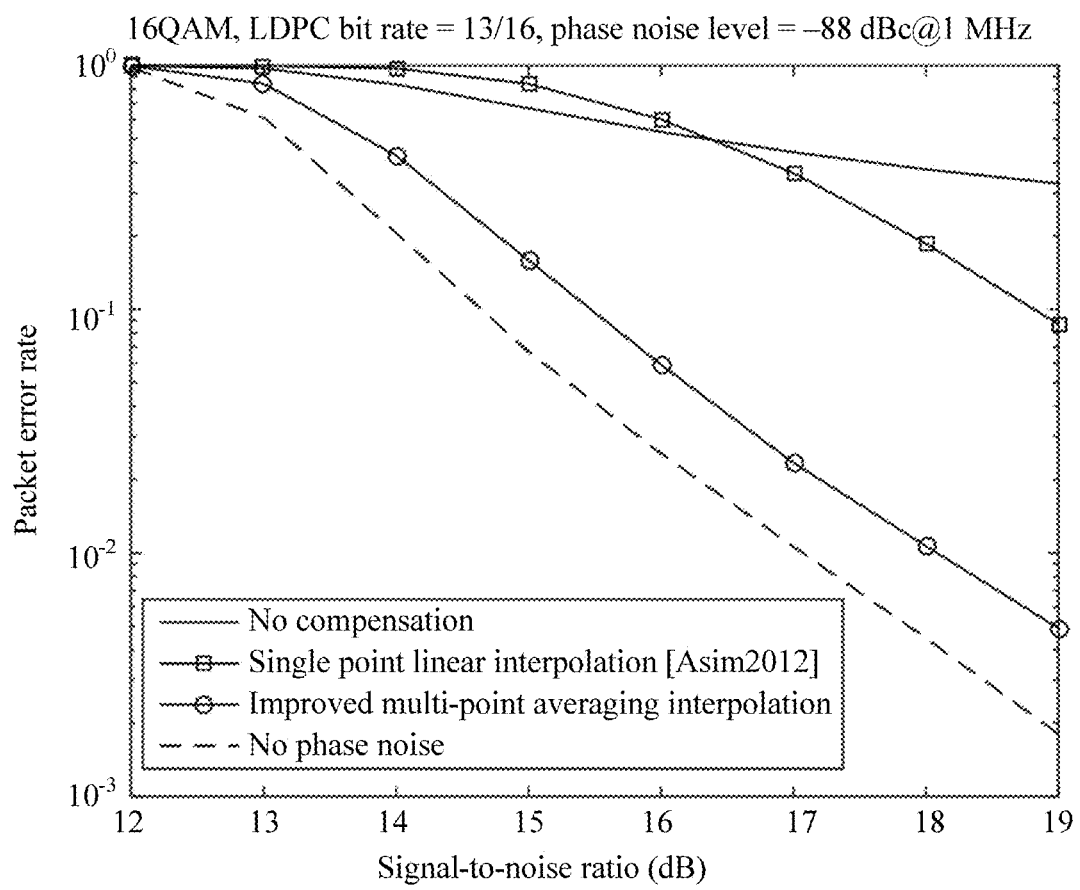
FIG. 7 is a schematic diagram of simulated data according to an embodiment of the present application.

FIG. 7 is a simulation diagram of beneficial effects of a signal transmission method according to an embodiment of the present application. A vertical axis indicates a packet error rate and a horizontal axis indicates a signal-to-noise ratio. In FIG. 7, a curve with blocks is corresponding to a pilot configuration scheme in which 32 single-point pilot symbols are evenly inserted into one data block, and a curve with circles is corresponding to a pilot configuration scheme in which four pilot blocks, each including eight pilot symbols, are used. It can be seen that with same overheads, a pilot block-based pilot configuration scheme and a receiver processing scheme proposed in the present application can implement a lower packet error rate and effectively improve system performance.

Figure 8:
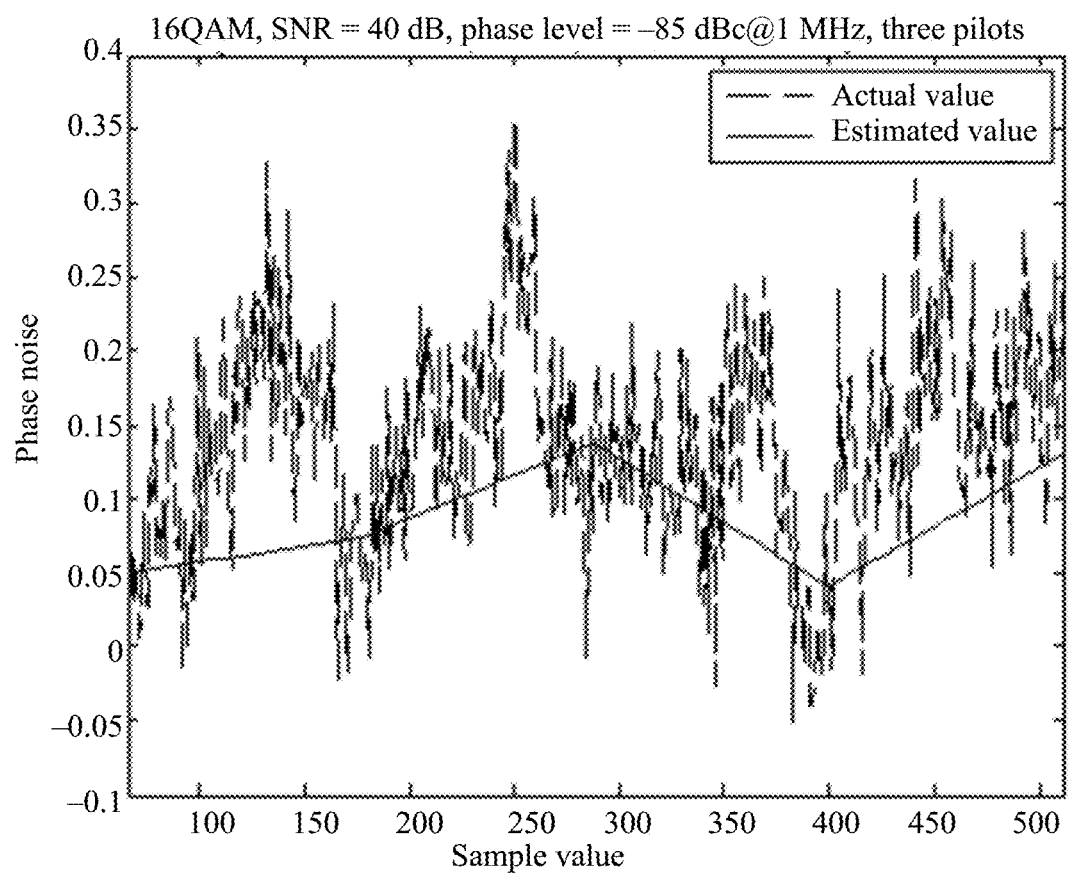
FIG. 8 is a schematic diagram of simulated data according to an embodiment of the present application.
Figure 9:
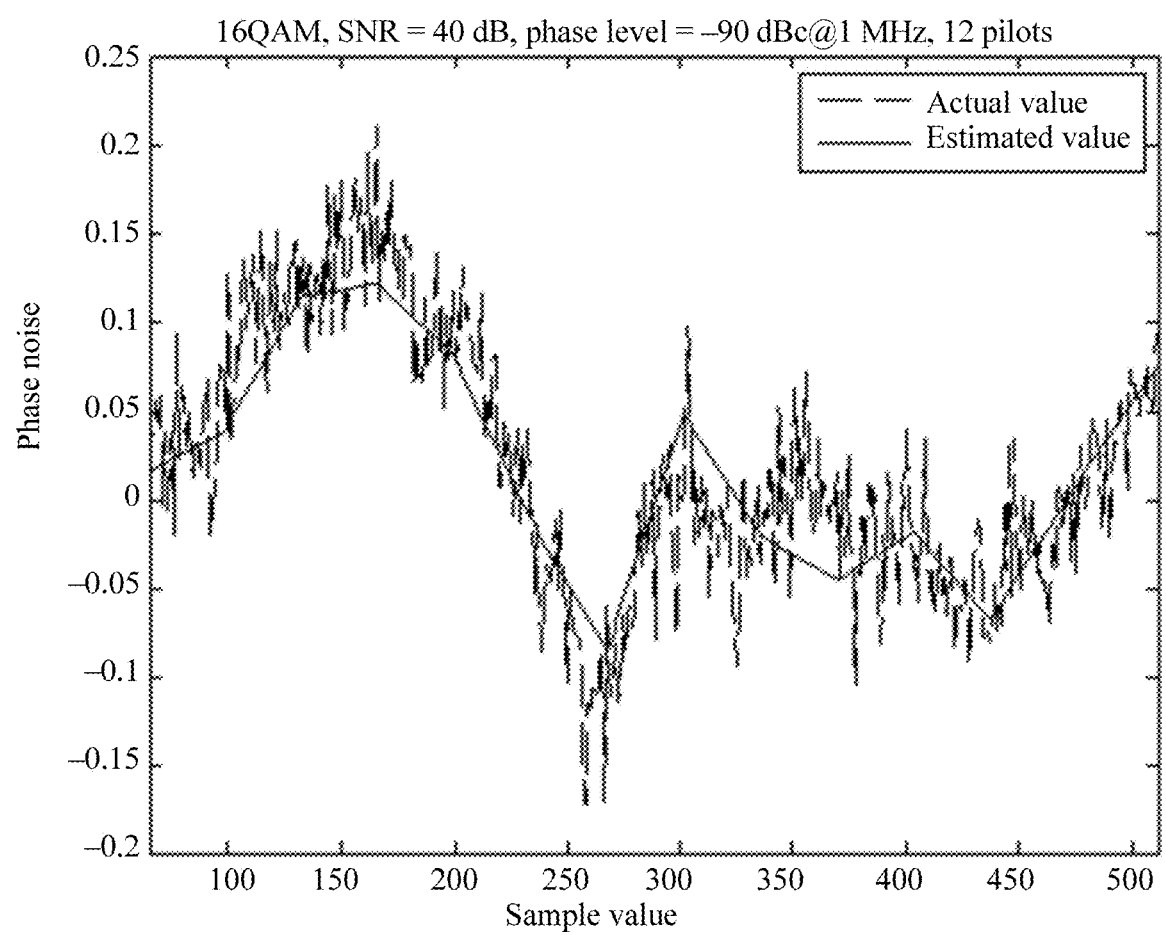
FIG. 9 is a schematic diagram of simulated data according to an embodiment of the present application.

However, in the prior art, in a scenario of a relatively high signal-to-noise ratio, a phase noise at a position of a single-point pilot can be accurately estimated by using the single-point pilot. As mentioned above, an amplitude of a phase noise is related to a manufacturing technique and a use scenario. When device temperature increases, a phase noise level also increases. It should be noted that a fixed pilot density is used in the prior art. This configuration cannot adapt to a nature that a phase noise level is changing. As shown in FIG. 8, when a phase noise level is relatively high, if quite few pilots are used, a low frequency envelope of a phase noise cannot be accurately estimated and compensation cannot be performed. As shown in FIG. 9, when a phase noise level is relatively low and excessive pilots are used, phase noise estimation and compensation can be performed accurately, but excessively high pilot overheads cause a waste of resources and an overall system throughput is not highest. It can be learned that a fixed pilot configuration cannot adapt to a scenario in which a phase noise level constantly changes, and cannot adapt to differences between phase noise levels of different users in a multi-user scenario.

Figure 10:
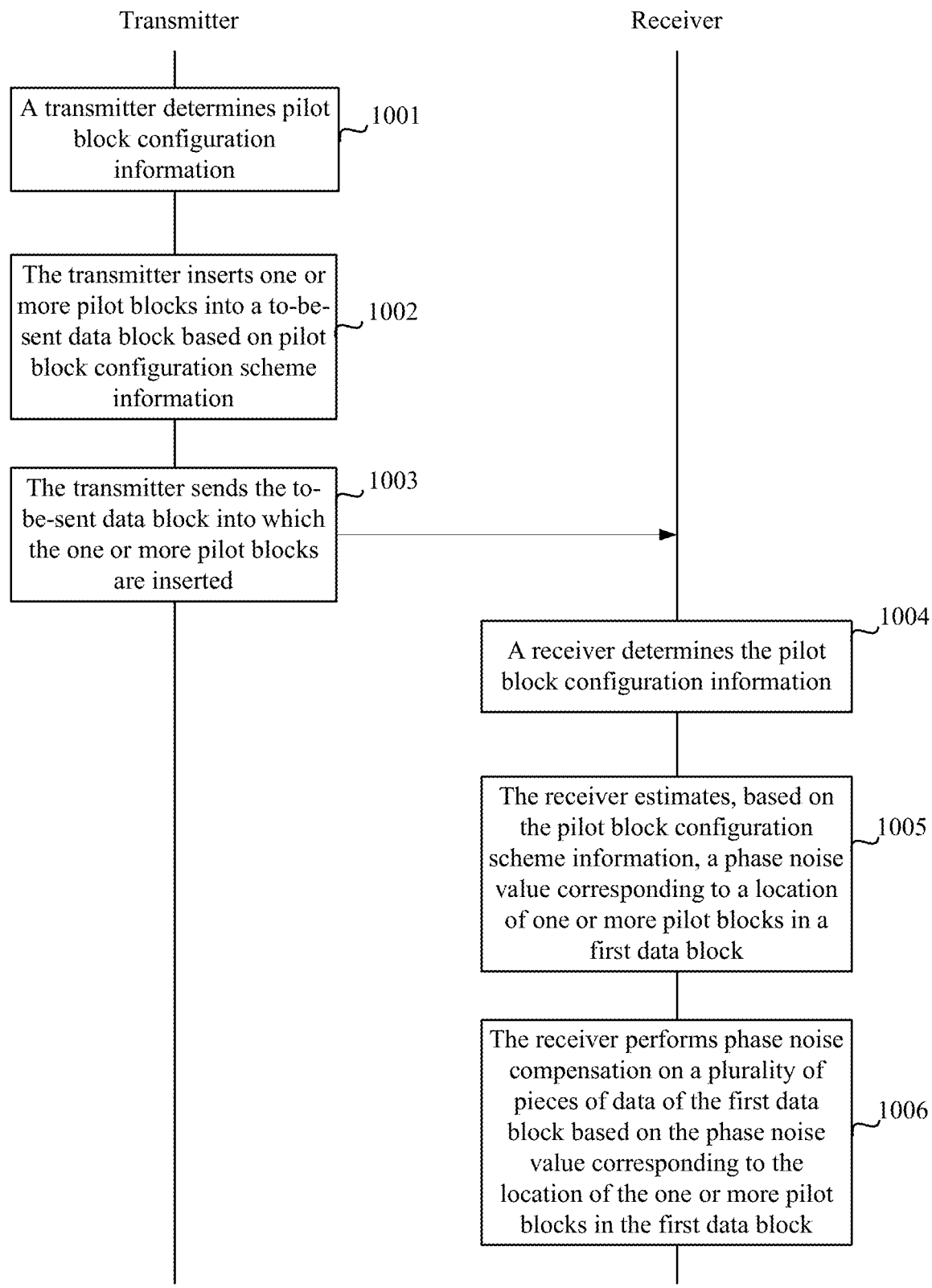
FIG. 10 is a schematic flowchart of a signal transmission method according to an embodiment of the present application.

Based on the foregoing description, to resolve the problem existing in the prior art, FIG. 10 shows a procedure of a signal transmission method according to an embodiment of the present application. The procedure may be performed by a signal transmission apparatus, and the apparatus may be a communications device such as a base station or a terminal.

As shown in FIG. 10, the procedure specifically includes the following steps:

Step 1001. A transmitter determines pilot block configuration information.

Step 1002. The transmitter inserts one or more pilot blocks into a to-be-sent data block based on pilot block configuration scheme information.

Step 1003. The transmitter sends, to a receiver, the to-be-sent data block into which the one or more pilot blocks are inserted.

Step 1004. The receiver determines the pilot block configuration information, where the pilot block configuration information includes the pilot block configuration scheme information.

Step 1005. The receiver estimates, based on the pilot block configuration scheme information, a phase noise value corresponding to a position of one or more pilot blocks in a first data block.

Step 1006. The receiver performs phase noise compensation on a plurality of pieces of data of the first data block based on the phase noise value corresponding to the position of the one or more pilot blocks in the first data block.

In this embodiment of the present application, the pilot block configuration information includes the pilot block configuration scheme information. The pilot block configuration scheme information may include a number of the pilot block configuration scheme; or a quantity of the pilot blocks and a quantity of pilot symbols included in the pilot block; or an offset value of a quantity of the pilot blocks and an offset value of a quantity of pilot symbols included in the pilot block. A number of the pilot block configuration scheme is corresponding to one pilot block configuration scheme. The pilot block configuration scheme may be corresponding to a quantity of the pilot blocks and a quantity of pilot symbols included in the pilot block, or an offset value of a quantity of the pilot blocks and an offset value of a quantity of pilot symbols included in the pilot block, as shown in examples in Table 1 and Table 2.

TABLE 1

| Number | Pilot block configuration scheme |
|---|---|
| 1 | There are two pilot blocks, and each pilot block includes four pilot symbols. |
| 2 | There are three pilot blocks, and each pilot block includes three pilot symbols. |
| 3 | There are four pilot blocks. A first pilot block includes two pilot symbols, a second pilot block includes three pilot symbols, a third pilot block includes five pilot symbols, and a fourthpilot block includes two pilot symbols. |
| 4 | An offset value of a quantity of pilot blocks is 1, and an offset value of a quantity of pilot symbols included in a pilot block is 2. |
| 5 | An offset value of a quantity of pilot blocks is 3, and an offset value of a quantity of pilot symbols included in a pilot block is 3. |
| . . . | . . . |

The transmitter determines the pilot block configuration information in the following manner: obtaining, by the transmitter, noise level information corresponding to a current time period; and determining the pilot block configuration information based on the noise level information. The noise level information includes additive white noise information and multiplicative phase noise information. The noise level information corresponding to the current time period is obtained by performing demodulation and noise level estimation on the received data block by the receiver, and then is sent to the transmitter. The transmitter may determine the pilot block configuration information based on the obtained noise level information corresponding to the current time period. In this case, before obtaining the noise level information corresponding to the current time period, the transmitter needs to send a pre-agreed training sequence to the receiver, so that the receiver performs noise level estimation based on the pre-agreed training sequence. An algorithm used for noise level estimation is not limited in this embodiment of the present application.

The noise level information corresponding to the current time period may be alternatively noise level information that is determined by the transmitter by receiving the data block sent by the receiver, and performing noise level estimation on the received data block.

To enable the receiver to accurately determine the position of the pilot block in the data block, the transmitter needs to determine the pilot block configuration information based on the noise level information. If the additive white noise information is greater than additive white noise information obtained last time or the multiplicative phase noise information is less than multiplicative phase noise information obtained last time, the transmitter may increase the quantity of pilot symbols included in each pilot block in the to-be-sent data block, or decrease the quantity of the pilot blocks. If the additive white noise information is less than additive white noise information obtained last time and the multiplicative phase noise information is greater than multiplicative phase noise information obtained last time, the transmitter may decrease the quantity of pilot symbols included in each pilot block in the to-be-sent data block, or increase the quantity of the pilot blocks.

For example, when a white noise level is relatively high but a phase noise level is relatively low, the transmitter may increase the quantity of pilot symbols in each pilot block, so that when the receiver performs phase noise estimation, white noise impact is effectively reduced and a value of a phase noise of the pilot block is accurately estimated. When a white noise level is relatively low but a phase noise level is relatively high, the transmitter may decrease the quantity of pilot symbols in each pilot block to reduce pilot overheads for filtering out a white noise, and increase the quantity of the pilot blocks so that the receiver more effectively estimates a low frequency envelope of a phase noise and performs compensation.

The transmitter determines new pilot block configuration information based on the received noise level information, and notifies the receiver of this pilot block configuration information. After determining the pilot block configuration information, the transmitter sends the pilot block configuration information to the receiver; or the transmitter sets the pilot block to a preset sequence or a modulation constellation diagram based on the pilot block configuration information. The transmitter may add the pilot block configuration information to the data block and then send the data block to the receiver, or may send the pilot block configuration information to the receiver on a secondary communications link such as a low frequency link. Correspondingly, the transmitter may insert the pilot block by using a special sequence or a modulation constellation diagram that is different from that of the data block. For example, 16QAM (quadrature amplitude modulation) is used for the data block, while BPSK (binary phase shift keying) is used for the pilot block.

The pilot block configuration information notified to the receiver by the transmitter may include complete pilot block configuration scheme information that includes new values of a quantity J of pilot blocks and a quantity K of symbol points in a pilot block; or may be an offset between a new value of J and a previous quantity of pilot blocks, that is, dJ=J2−J1, and an offset between a new value of K and a previous quantity of pilot symbols in a pilot block, that is, dK=K2−K1, where J2 and K2 constitute new pilot block configuration scheme information, and J1 and K1 constitute previous pilot block configuration scheme information.

After determining the pilot block configuration scheme information, the transmitter inserts the one or more pilot blocks into the to-be-sent data block based on the pilot block configuration scheme information. If the pilot block configuration scheme information includes the quantity of the pilot blocks and the quantity of pilot symbols included in the pilot block, the transmitter calculates the position of the pilot block in the data block according to a pre-agreed formula by using a length of the to-be-sent data block, the quantity of the pilot blocks, and the quantity of pilot symbols in the pilot block, and inserts the one or more pilot blocks into the to-be-sent data block based on the position of the pilot block.

If the pilot block configuration scheme information includes the offset value of the quantity of the pilot blocks and the offset value of the quantity of pilot symbols included in the pilot block, the transmitter calculates the position of the pilot block according to a pre-agreed formula by using a length of the to-be-sent data block, the offset value of the quantity of the pilot blocks, the offset value of the quantity of pilot symbols included in the pilot block, and a quantity of pilot blocks and a quantity of pilot symbols included in a pilot block that are in pilot block configuration information received last time; and inserts the one or more pilot blocks into the to-be-sent data block based on the position of the pilot block.

In this embodiment of the present application, the first data block received by the receiver is the data block into which the one or more pilot blocks are inserted and that is sent by the transmitter. After receiving the first data block, the receiver further needs to receive a second data block sent by the transmitter, and then perform demodulation and noise level estimation on the second data block to obtain noise level information of the second data block. The receiver sends the noise level information to the transmitter, so that the transmitter determines the pilot block configuration information based on the noise level information.

Specifically, when the receiver performs noise level estimation on the second data block, if the second data block is a pre-agreed training sequence, the receiver may perform noise level estimation by using the received second data block. An estimation method is not limited in this embodiment of the present application. If the second data block is unknown data, the receiver needs to perform noise level estimation on the second data block based on a to-be-sent data block that is reconstructed after soft or hard decision decoding and the second data block. The unknown data may be data that has never been received by the receiver.

After receiving the first data block, the receiver further needs to determine the pilot block configuration information. The pilot block configuration information may be pilot block configuration information sent by the transmitter and obtained by the receiver, or may be determined by the receiver based on a preset sequence or a modulation constellation diagram in the first data block. For example, a special sequence or a modulation constellation diagram that is different from that of the first data block is used for the pilot block, and the receiver may learn of the pilot block configuration information through blind detection.

After determining the pilot block configuration information, the receiver estimates, based on the pilot block configuration scheme information in the pilot block configuration information, the phase noise value corresponding to the position of the one or more pilot blocks in the first data block.

If the pilot block configuration scheme information includes the quantity of the pilot blocks and the quantity of pilot symbols included in the pilot block, the receiver calculates the position of the pilot block in the first data block according to a pre-agreed formula by using a length of the first data block, the quantity of the pilot blocks, and the quantity of pilot symbols in the pilot block; and estimates a noise level corresponding to the position of the one or more pilot blocks.

If the pilot block configuration scheme information includes the offset value of the quantity of the pilot blocks and the offset value of the quantity of pilot symbols included in the pilot block, the receiver calculates the position of the pilot block in the first data block according to a pre-agreed formula by using a length of the first data block, the offset value of the quantity of the pilot blocks, the offset value of the quantity of pilot symbols included in the pilot block, and a quantity of pilot blocks and a quantity of pilot symbols included in a pilot block that are in pilot block configuration information received last time; and estimates a noise level corresponding to the position of the one or more pilot blocks.

For example, if new pilot block configuration scheme information includes new values of a quantity J of pilot blocks and a quantity K of pilot symbols included in a pilot block, the receiver may determine a new pilot position according to a calculation formula, for subsequent phase noise estimation and compensation, where the calculation formula is used to determine a position of each pilot in a data block by using a data block length N, a unique-word length M, a valid-data length L, a quantity J of pilot blocks, and a quantity K of pilot symbols in a pilot block. If the new pilot block configuration scheme information includes values dJ and dK of offsets between new pilot block configuration information and previous pilot block configuration information, after calculating values J2=dJ+J1 and K2=dK+K1 in the new pilot block configuration information based on values of J1 and K1 in the previous pilot block configuration information, the receiver determines a new pilot block position by using the foregoing method, for subsequent phase noise estimation and compensation. A specific phase noise estimation and compensation method is not limited in this embodiment of the present application.

Figure 11:
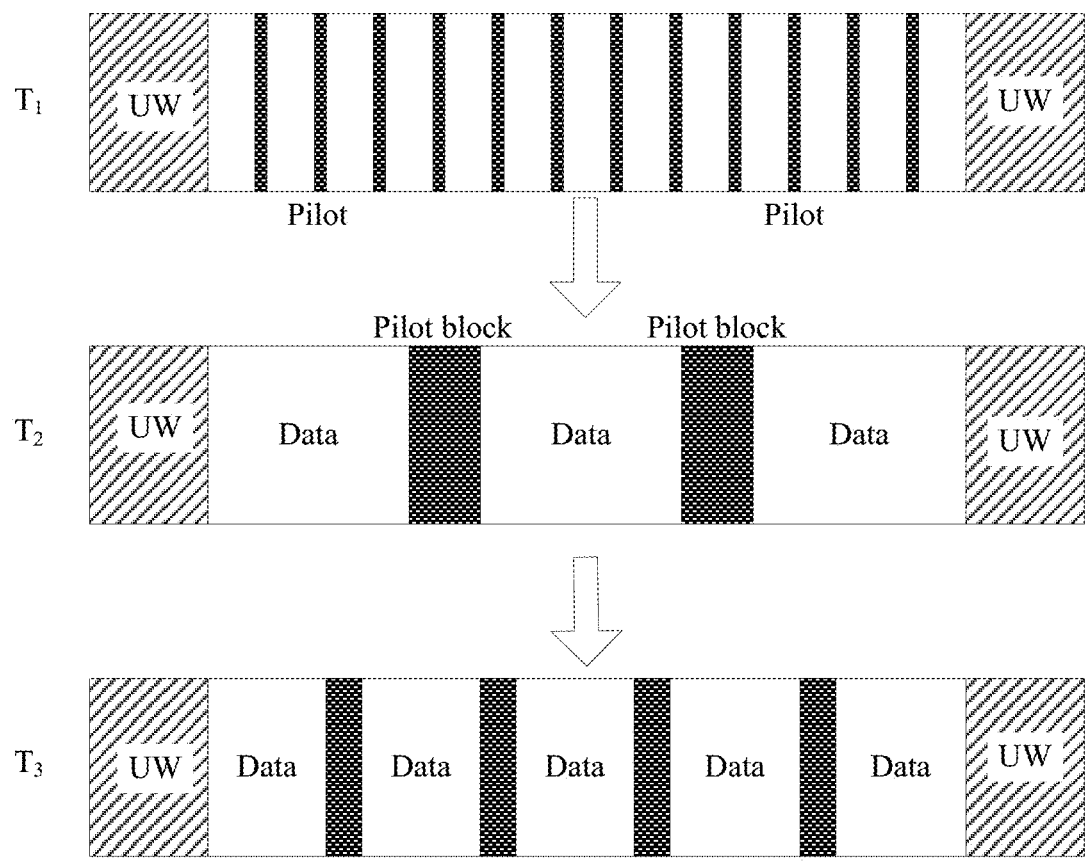
FIG. 11 is a schematic diagram of a change in a quantity of pilot blocks in a signal transmission process according to an embodiment of the present application.

In this embodiment of the present application, according to the signal transmission method provided in this embodiment of the present application, a size of a pilot block in a data block and a quantity of the pilot blocks in the data block can be dynamically adjusted, to adapt to a changing phase noise level and avoid a poor phase noise suppression effect or a waste of pilot resources. This can provide an additional means for a high-frequency communications system to deal with a non-ideal radio frequency factor, so as to improve link stability and help increase a system throughput. FIG. 11 shows a change of a pilot block as time and a phase noise level change during signal transmission according to an embodiment of the present application. As shown in FIG. 11, there are moments T1, T2, and T3. From the moment T1 to the moment T2, a quantity of the pilot blocks decreases, but a size of each pilot block increases. From the moment T2 to the moment T3, the quantity of the pilot blocks increases, but the size of each pilot block decreases. These changes are caused by a signal transmission system to adapt to changes in a signal-to-noise ratio and a phase noise level, so as to ensure signal transmission stability and increase a throughput.

Figure 12A:
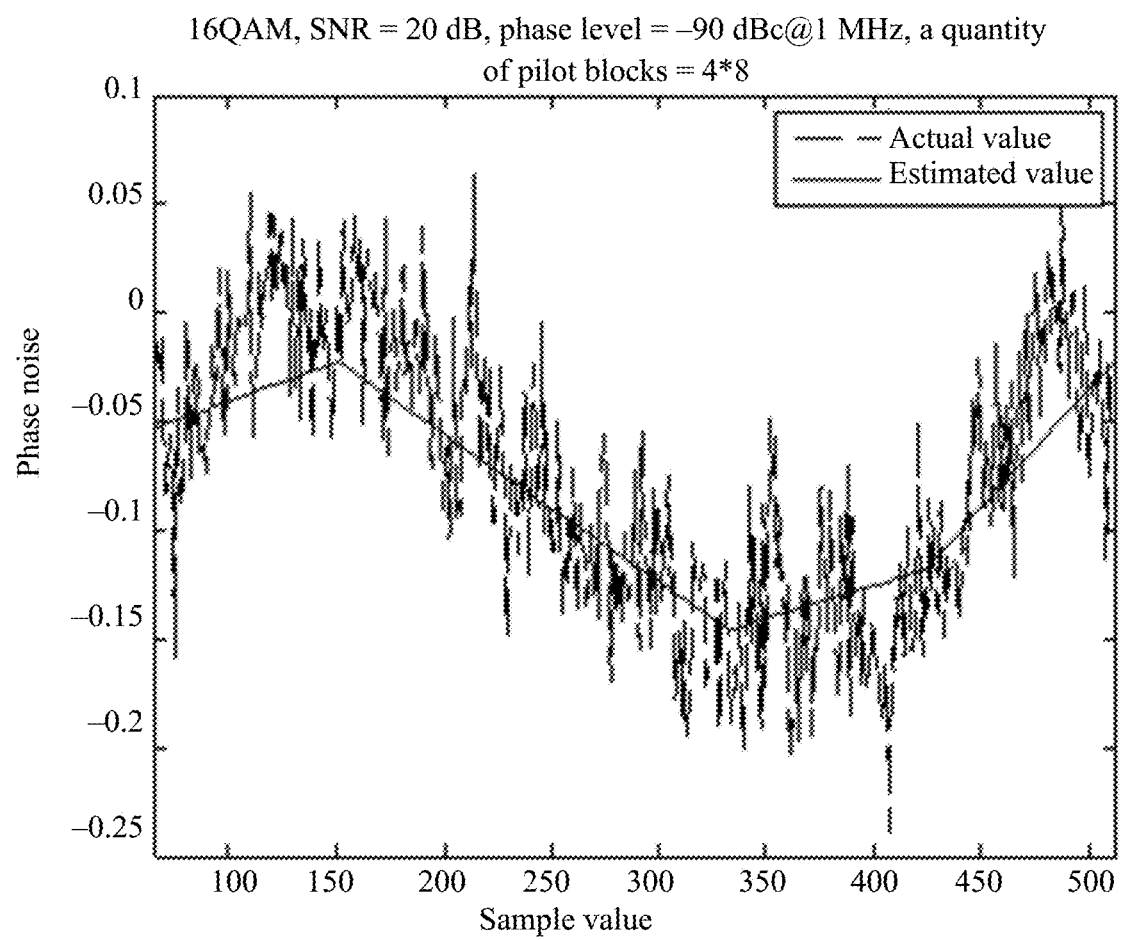
FIG. 12A and FIG. 12B are schematic diagrams of simulated data at a moment T2 and a moment T3 in FIG. 11 according to an embodiment of the present application.
Figure 12B:
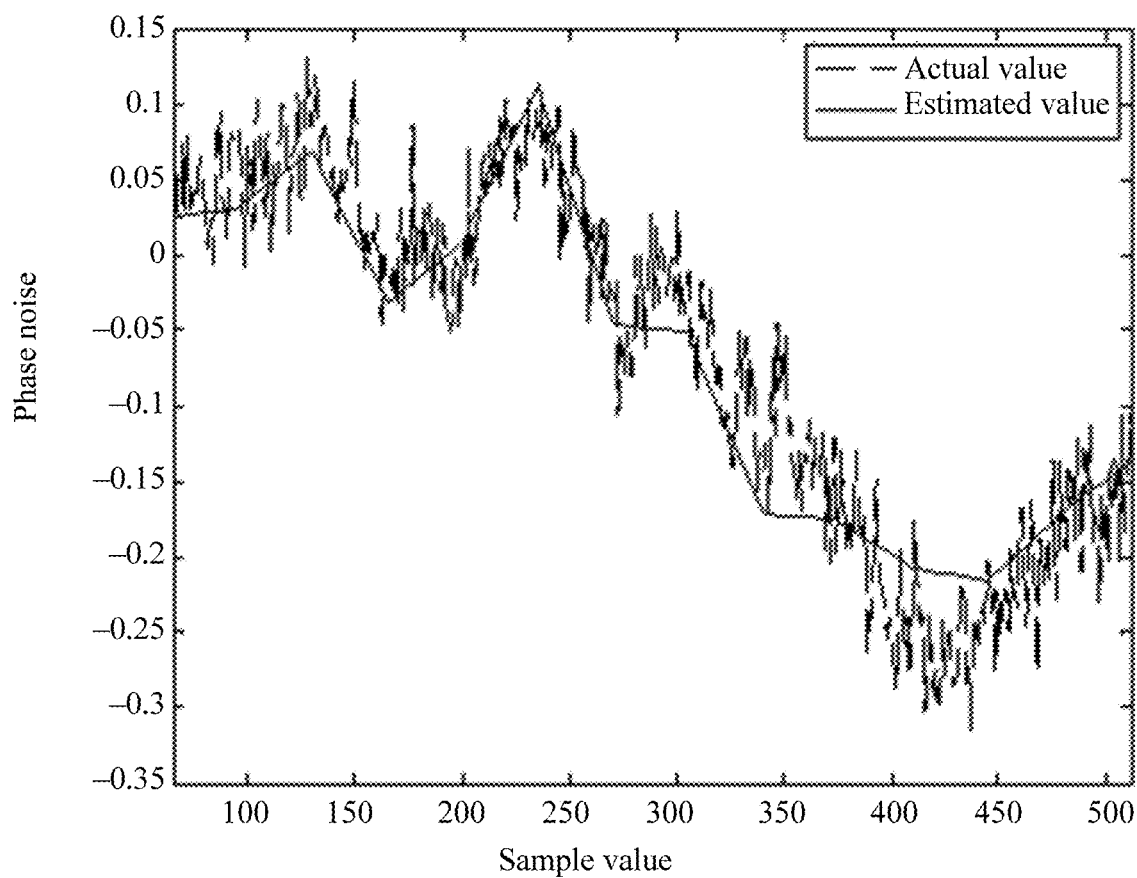

FIG. 12A and FIG. 12B show phase noises actually added and phase noise values estimated by a receiver in simulation at the moment T2 and the moment T3. It can be seen from FIG. 12A and FIG. 12B that the signal transmission method provided in this embodiment of the present application can achieve the following effects: With appropriate pilot overheads, a low frequency envelope of a phase noise can be effectively tracked and compensation can be performed at a receiver to suppress a phase noise.

Figure 13:
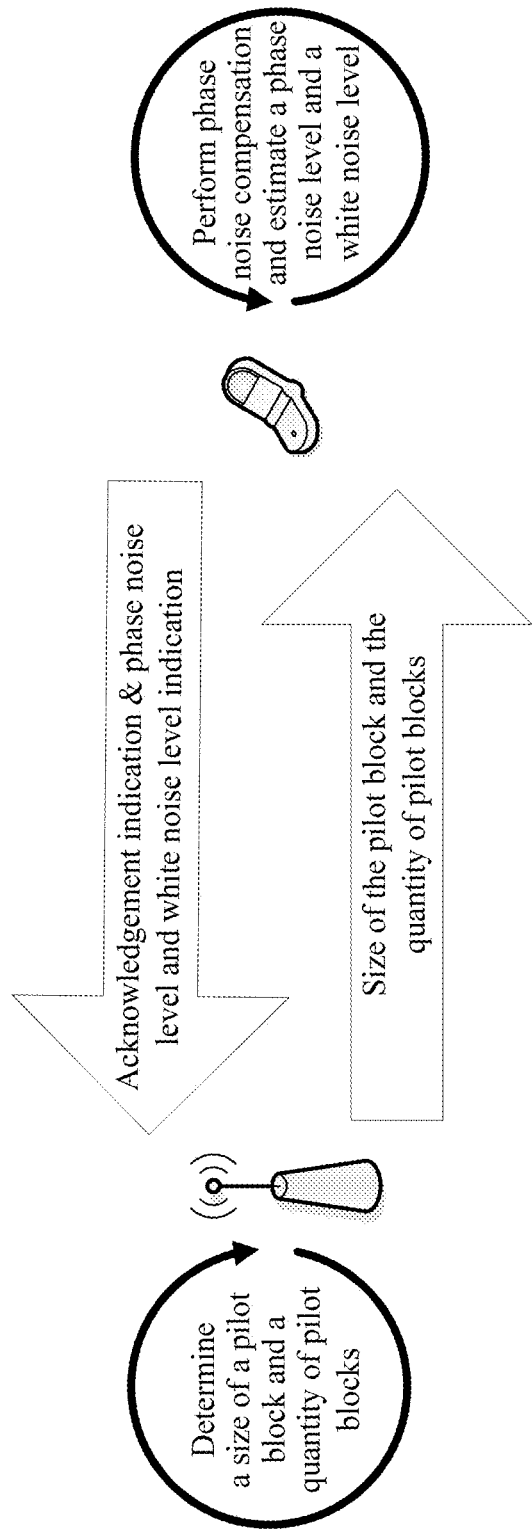
FIG. 13 is a schematic principle diagram of an implementation according to an embodiment of the present application.

FIG. 13 is a schematic principle diagram of an implementation of a signal transmission method according to an embodiment of the present application. As shown in FIG. 13, a transmitter continuously adjusts a pilot configuration scheme based on a noise level estimated and fed back by a receiver, to help the receiver perform phase noise compensation. This reduces overheads while maintaining communications link reliability, and increases a system throughput as much as possible.

Figure 14:
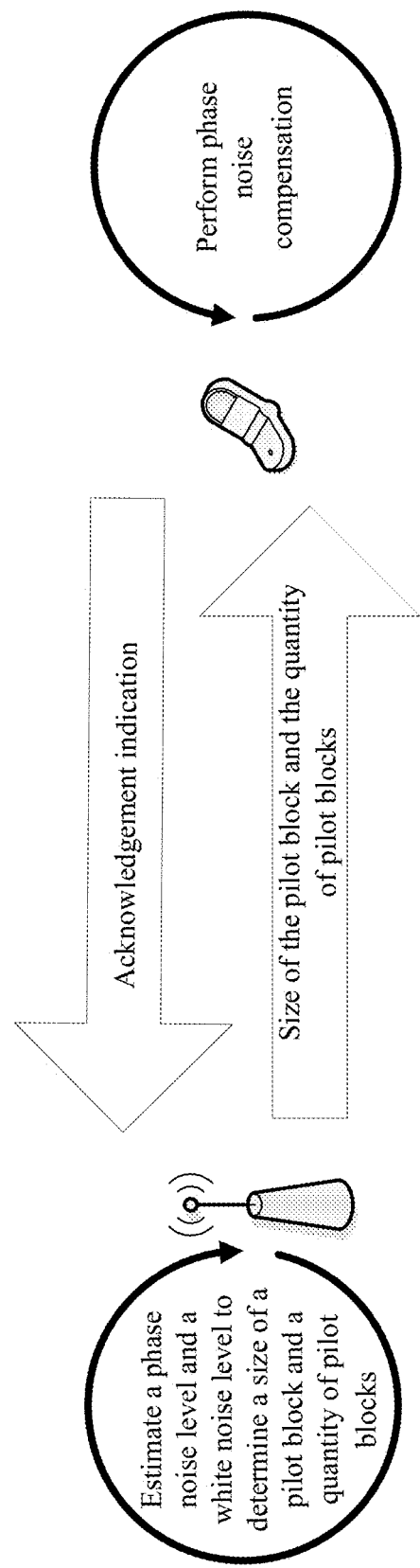
FIG. 14 is a schematic principle diagram of another implementation according to an embodiment of the present application.

FIG. 14 is a schematic principle diagram of another implementation of a signal transmission method according to an embodiment of the present application. As shown in FIG. 14, a transmitter estimates a noise level by itself and continuously adjusts a pilot configuration scheme, and a receiver correspondingly updates a phase noise estimation and compensation scheme. This implementation uses transmission channel symmetry, to be specific, a noise level for sending information by a transmitter to a receiver is approximately the same as a noise level for sending information by the receiver to the transmitter.

According to the signal transmission method provided in the foregoing embodiment, current white noise and phase noise levels may be estimated, and a pilot configuration scheme and a compensation algorithm at a receiver may be correspondingly adjusted. This can not only ensure transmission reliability, but also control pilot overheads, thereby increasing a system throughput.

Figure 15:
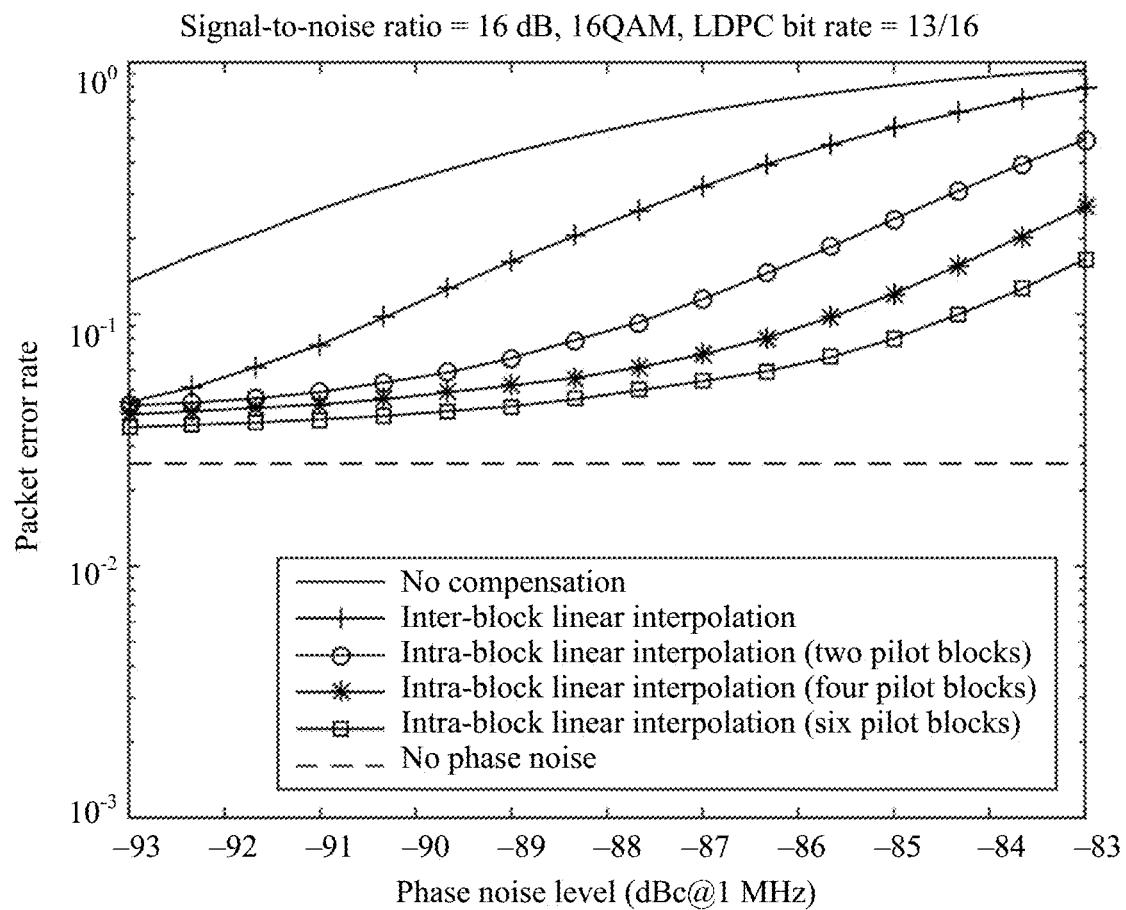
FIG. 15 is a schematic diagram of simulated data according to an embodiment of the present application.

FIG. 15 is a simulation diagram of beneficial effects of a signal transmission method according to an embodiment of the present application. A vertical axis indicates a packet error rate, and a horizontal axis indicates a phase noise power value corresponding to a 1 MHz frequency in a power spectrum. A phase noise of a larger power value causes more severe performance deterioration to a high-frequency communications system. A signal-to-noise ratio used in simulation is a fixed value. A signal transmission scheme and a phase noise model in the simulation are the same as those used in FIG. 7. It can be seen from FIG. 15 that with a given pilot configuration, a packet error rate increases with a phase noise power level. Based on communications system design experience, a system throughput can be effectively improved by maintaining a packet error rate around 0.1. In this example, a fixed-pilot-configuration scheme is used. If a pilot configuration scheme with two pilot blocks is used and represented by a curve with circles, a packet error rate rapidly increases as a phase noise power level increases, and this reduces transmission reliability. If a pilot configuration scheme with four pilot blocks is used and represented by a curve with asterisks, a packet error rate drops below 0.05 as a phase noise power level decreases, and this causes a waste of pilot resources and affects maximization of a system throughput.

It can be seen from FIG. 15 that when an adaptive-pilot-configuration scheme and a corresponding phase noise compensation algorithm at a receiver are used, a system packet error rate can be maintained around 0.1, thereby increasing a system throughput. The scheme provided herein is specific to a scenario in which a signal-to-noise ratio is fixed. In the pilot configuration scheme in the foregoing signal transmission method, a quantity of the pilot blocks is increased or decreased based only on a rise or a decline in a phase noise power level, but a quantity of pilot symbols in each pilot block is not adjusted. In addition, according to the pilot configuration scheme in the foregoing signal transmission method, a communications system can make self-adaptation more freely.

Table 2 lists quantities of pilot blocks required to maintain a packet error rate around 0.1 under different phase noise power levels when a same system configuration as that in FIG. 7 is used. It can be learned that a higher phase noise power level requires more pilot blocks. According to the adaptive-pilot-configuration scheme provided in the present application, a pilot configuration can be automatically adjusted to adapt to a change in a phase noise power level. This reduces pilot overheads and increases a transmission system throughput while ensuring system reliability.

TABLE 2

| Phase noise level | −91 | −88 | −86 | −85 |
|---|---|---|---|---|
| Quantity of pilot blocks | 0 | 2 | 4 | 6 |
| Packet error rate | 0.07579 | 0.08554 | 0.08837 | 0.08011 |

Figure 16:
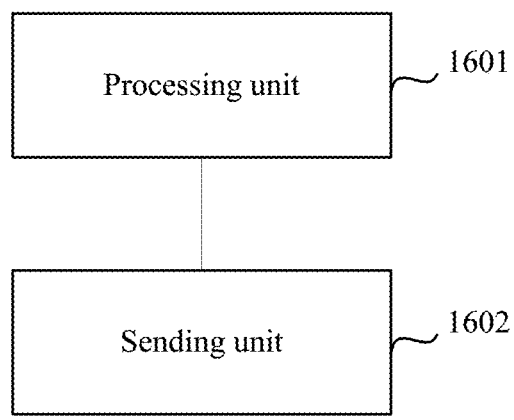
FIG. 16 is a schematic structural diagram of a signal transmission apparatus according to an embodiment of the present application.

Based on a same technical idea, FIG. 16 shows a structure of a signal transmission apparatus according to an embodiment of the present application. The apparatus may perform a signal transmission procedure, and may be a base station or a terminal.

As shown in FIG. 16, the apparatus specifically includes:

a processing unit 1601, configured to: obtain a to-be-sent data block, where the to-be-sent data block includes a plurality of pieces of data; and insert one or more pilot blocks among the plurality of pieces of data of the to-be-sent data block based on an agreed position, where the pilot block includes at least two consecutive pilot symbols; and a sending unit 1602, configured to send the to-be-sent data block into which the one or more pilot blocks are inserted by the processing unit 1601.

Preferably, the agreed position is a position pre-agreed on by the transmitter and a receiver; or the agreed position is calculated by the transmitter according to a pre-agreed formula by using a length of the to-be-sent data block, a quantity of the pilot blocks, and a quantity of pilot symbols in the pilot block.

Figure 17:
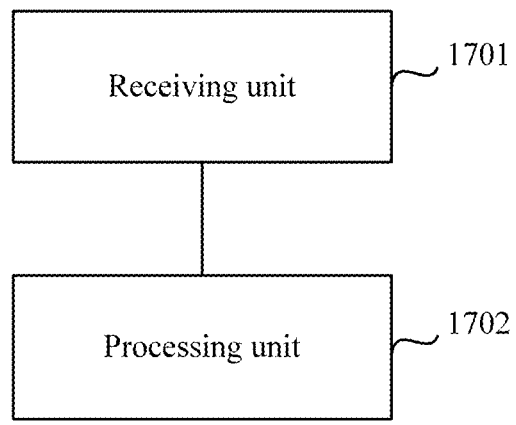
FIG. 17 is a schematic structural diagram of a signal transmission apparatus according to an embodiment of the present application.

Based on a same technical idea, FIG. 17 shows a structure of a signal transmission apparatus according to an embodiment of the present application. The apparatus may perform a signal transmission procedure, and may be a base station or a terminal.

As shown in FIG. 17, the apparatus specifically includes:

a receiving unit 1701, configured to receive a data block sent by a transmitter, where the received data block includes one or more pilot blocks, and the pilot block includes at least two consecutive pilot symbols; and a processing unit 1702, configured to: determine a position of the one or more pilot blocks in the data block received by the receiving unit 1701, estimate a phase noise value corresponding to the position of the one or more pilot blocks in the received data block, and perform phase noise compensation on a plurality of pieces of data of the received data block based on the phase noise value corresponding to the position of the one or more pilot blocks in the received data block.

Preferably, the processing unit 1702 is specifically configured to:

determine the position of the one or more pilot blocks in the received data block in a manner that is agreed on with the transmitter; or calculate the position of the one or more pilot blocks in the received data block according to a pre-agreed formula by using a length of the received data block, a quantity of the pilot blocks, and a quantity of pilot symbols included in the pilot block.

Preferably, the processing unit 1702 is specifically configured to:

estimate, by using an interpolation algorithm and based on the phase noise value corresponding to the position of the one or more pilot blocks in the received data block, phase noise values corresponding to positions of the plurality of pieces of data of the received data block; and perform phase noise compensation on the plurality of pieces of data of the received data block based on the estimated phase noise values corresponding to the positions of the plurality of pieces of data of the received data block.

Preferably, the processing unit 1702 is specifically configured to:

estimate, by using a weighted averaging algorithm, the phase noise value corresponding to the position of the one or more pilot blocks in the received data block.

Figure 18:
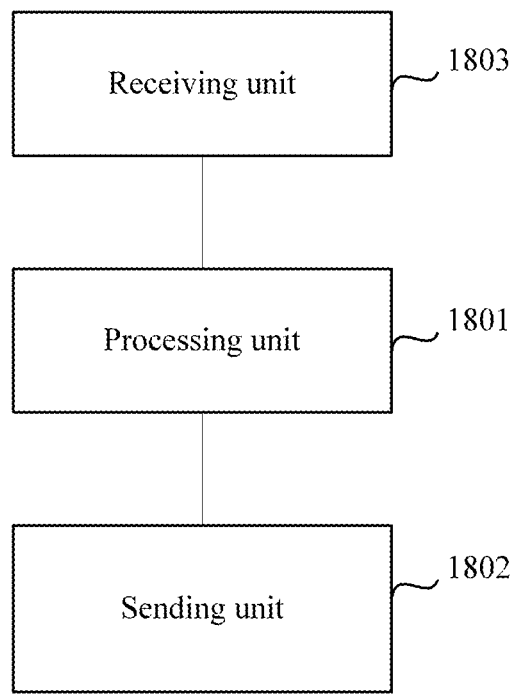
FIG. 18 is a schematic structural diagram of a signal transmission apparatus according to an embodiment of the present application.

Based on a same technical idea, FIG. 18 shows a structure of a signal transmission apparatus according to an embodiment of the present application. The apparatus may perform a signal transmission procedure, and may be a base station or a terminal.

As shown in FIG. 18, the apparatus specifically includes:

a processing unit 1801, configured to: determine pilot block configuration information, where the pilot block configuration information includes pilot block configuration scheme information; and insert one or more pilot blocks into a to-be-sent data block based on the pilot block configuration scheme information; and a sending unit 1802, configured to send the to-be-sent data block into which the one or more pilot blocks are inserted by the processing unit 1801.

Preferably, the processing unit 1801 is specifically configured to:

obtain noise level information corresponding to a current time period; and determine the pilot block configuration information based on the noise level information.

Preferably, the apparatus further includes a receiving unit 1803, and the receiving unit 1803 is configured to receive noise level information sent by a receiver; or the receiving unit 1803 is configured to receive a data block sent by the receiver, and the processing unit 1801 is further configured to perform noise level estimation on the data block received by the receiving unit 1803, to determine the noise level information.

Preferably, the noise level information includes additive white noise information and multiplicative phase noise information; and the processing unit 1801 is specifically configured to:

if the additive white noise information is greater than additive white noise information obtained last time or the multiplicative phase noise information is less than multiplicative phase noise information obtained last time, increase a quantity of pilot symbols included in each pilot block in the to-be-sent data block, or decrease a quantity of the pilot blocks; or if the additive white noise information is less than additive white noise information obtained last time or the multiplicative phase noise information is greater than multiplicative phase noise information obtained last time, decrease a quantity of pilot symbols included in each pilot block in the to-be-sent data block, or increase a quantity of the pilot blocks.

Preferably, the sending unit 1802 is further configured to:

before the noise level information is obtained, send a pre-agreed training sequence to the receiver, so that the receiver performs noise level estimation based on the pre-agreed training sequence.

Preferably, the pilot block configuration scheme information includes a number of the pilot block configuration scheme; or a quantity of the pilot blocks and a quantity of pilot symbols included in the pilot block; or an offset value of a quantity of the pilot blocks and an offset value of a quantity of pilot symbols included in the pilot block.

Preferably, the processing unit 1801 is specifically configured to:

calculate a position of the pilot block in the to-be-sent data block according to a pre-agreed formula by using a length of the to-be-sent data block, the quantity of the pilot blocks, and the quantity of pilot symbols in the pilot block; or calculate a position of the pilot block according to a pre-agreed formula by using a length of the to-be-sent data block, the offset value of the quantity of the pilot blocks, the offset value of the quantity of pilot symbols included in the pilot block, and a quantity of pilot blocks and a quantity of pilot symbols included in a pilot block that are in pilot block configuration information received last time; and insert the one or more pilot blocks into the to-be-sent data block based on the position of the pilot block.

Preferably, after the pilot block configuration information is determined, the sending unit 1802 is further configured to send the pilot block configuration information to the receiver; or the processing unit 1801 is further configured to set the pilot block to a preset sequence or a modulation constellation diagram based on the pilot block configuration information.

Figure 19:
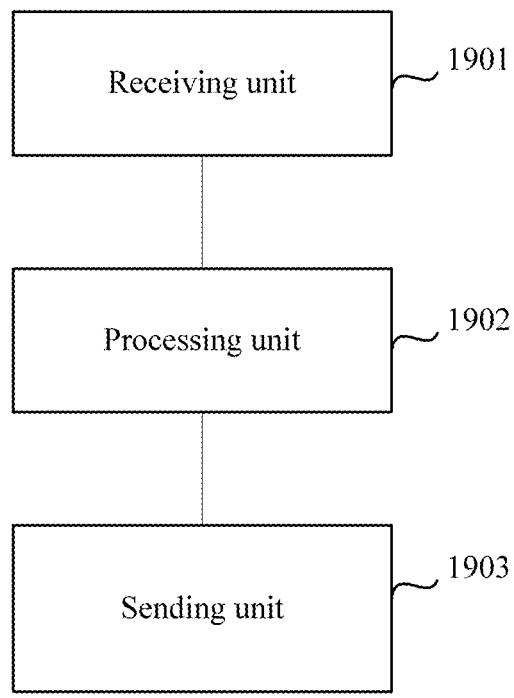
FIG. 19 is a schematic structural diagram of a signal transmission apparatus according to an embodiment of the present application.

Based on a same inventive idea, FIG. 19 shows a structure of a signal transmission apparatus according to an embodiment of the present application. The apparatus may perform a signal transmission procedure, and may be a base station or a terminal.

As shown in FIG. 19, the apparatus specifically includes:

a receiving unit 1901, configured to receive a first data block sent by a transmitter; and a processing unit 1902, configured to: determine pilot block configuration information, where the pilot block configuration information includes pilot block configuration scheme information; estimate, based on the pilot block configuration scheme information, a phase noise value corresponding to a position of one or more pilot blocks in the first data block; and perform phase noise compensation on a plurality of pieces of data of the first data block based on the phase noise value corresponding to the position of the one or more pilot blocks in the first data block.

Preferably, the apparatus further includes a sending unit 1903;

before receiving the first data block sent by the transmitter and the pilot block configuration information in the first data block, the receiving unit 1901 is further configured to receive a second data block sent by the transmitter;

the processing unit 1902 is further configured to perform demodulation and noise level estimation on the second data block to obtain noise level information of the second data block; and the sending unit 1903 is configured to send the noise level information to the transmitter.

Preferably, the processing unit 1902 is specifically configured to:

if the second data block is a pre-agreed training sequence, perform noise level estimation by using the received second data block; or if the second data block is unknown data, perform noise level estimation on the second data block based on a to-be-sent data block that is reconstructed after soft or hard decision decoding and the second data block.

Preferably, the pilot block configuration scheme information includes a number of the pilot block configuration scheme; or a quantity of the pilot blocks and a quantity of pilot symbols included in the pilot block; or an offset value of a quantity of the pilot blocks and an offset value of a quantity of pilot symbols included in the pilot block.

Preferably, the processing unit 1902 is specifically configured to:

if the pilot block configuration scheme information includes the quantity of the pilot blocks and the quantity of pilot symbols included in the pilot block, calculate the position of the pilot block in the first data block according to a pre-agreed formula by using a length of the first data block, the quantity of the pilot blocks, and the quantity of pilot symbols in the pilot block; and estimate a phase noise level corresponding to the position of the one or more pilot blocks; or if the pilot block configuration scheme information includes the offset value of the quantity of the pilot blocks and the offset value of the quantity of pilot symbols included in the pilot block, calculate the position of the pilot block in the first data block according to a pre-agreed formula by using a length of the first data block, the offset value of the quantity of the pilot blocks, the offset value of the quantity of pilot symbols included in the pilot block, and a quantity of pilot blocks and a quantity of pilot symbols included in a pilot block that are in pilot block configuration information received last time; and estimate a phase noise level corresponding to the position of the one or more pilot blocks.

Preferably, the processing unit 1902 is specifically configured to:

obtain pilot block configuration information sent by the transmitter; or determine the pilot block configuration information based on a preset sequence or a modulation constellation diagram in the first data block.

Figure 20:
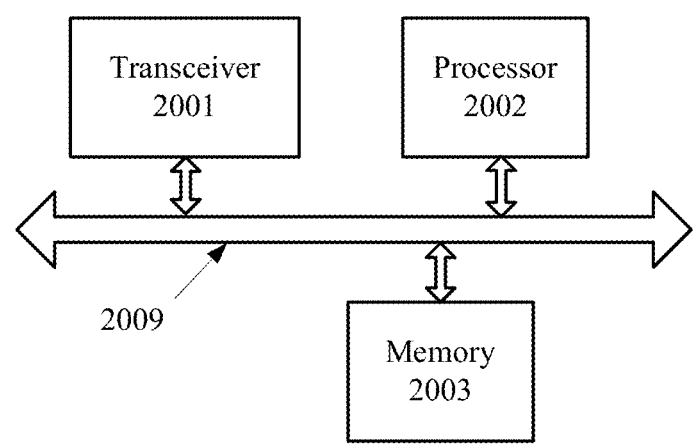
FIG. 20 is a schematic structural diagram of a signal transmission device according to an embodiment of the present application.

Based on a same idea, referring to FIG. 20, FIG. 20 shows a signal transmission device 2000 according to an embodiment of the present application. The signal transmission device 2000 may perform the steps implemented or the functions performed by the transmitter in the foregoing embodiments. The signal transmission device 2000 may include a transceiver 2001, a processor 2002, and a memory 2003. The processor 2002 is configured to control an operation of the signal transmission device 2000. The memory 2003 may include a read only memory and a random access memory and store an instruction and data executable by the processor 2002. A part of the memory 2003 may further include a non-volatile random access memory (NVRAM). Components such as the transceiver 2001, the processor 2002, and the memory 2003 are connected by a bus 2009. In addition to a data bus, the bus 2009 may include a power bus, a control bus, and a status signal bus. However, for clarity, the various buses are marked as the bus 2009 in the figure.

The signal transmission method disclosed in the embodiments of the present application may be applied to the processor 2002 or implemented by the processor 2002. In an implementation process, the steps of the processing procedure may be completed by an integrated logical circuit of hardware of the processor 2002, or by a software instruction. The processor 2002 may be a general purpose processor, a digital signal processor, an application-specific integrated circuit, a field programmable gate array or another programmable logic device, a discrete gate or a transistor logic device, or a discrete hardware component, and can implement or execute the methods, steps, and logical block diagrams disclosed in the embodiments of the present application. The general purpose processor may be a microprocessor, any conventional processor, or the like. The steps of the methods disclosed with reference to the embodiments of the present application may be directly implemented by a hardware processor, or may be implemented by a combination of hardware of a processor and a software module. The software module may be located in a mature storage medium in the art such as a random access memory, a flash memory, a read only memory, a programmable read only memory, an electrically erasable programmable memory, or a register. The storage medium is located in the memory 2003. The processor 2002 reads information stored in the memory 2003, and implements the steps of the signal transmission method in combination with hardware of the processor 2002.

The processor 2002 obtains a to-be-sent data block, where the to-be-sent data block includes a plurality of pieces of data; and inserts one or more pilot blocks among the plurality of pieces of data of the obtained to-be-sent data block based on an agreed position, where the pilot block includes at least two consecutive pilot symbols; and the transceiver 2001 sends the to-be-sent data block into which the one or more pilot blocks are inserted by the processor 2002.

Preferably, the agreed position is a position pre-agreed on by the transmitter and a receiver; or the agreed position is calculated by the transmitter according to a pre-agreed formula by using a length of the to-be-sent data block, a quantity of the pilot blocks, and a quantity of pilot symbols in the pilot block.

Figure 21:
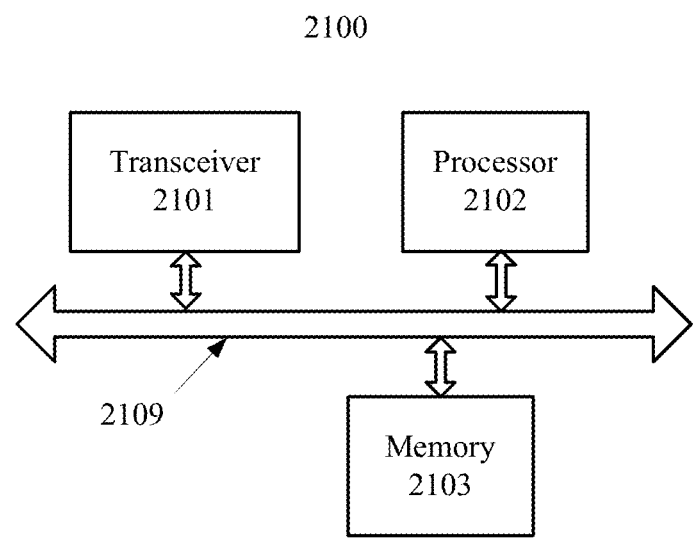
FIG. 21 is a schematic structural diagram of a signal transmission device according to an embodiment of the present application.

Based on a same idea, referring to FIG. 21, FIG. 21 shows a signal transmission device 2100 according to an embodiment of the present application. The signal transmission device 2100 may perform the steps implemented or the functions performed by the receiver in the foregoing embodiments. The signal transmission device 2100 may include a transceiver 2101, a processor 2102, and a memory 2103. The processor 2102 is configured to control an operation of the signal transmission device 2100. The memory 2103 may include a read only memory and a random access memory and store an instruction and data executable by the processor 2102. A part of the memory 2103 may further include a non-volatile random access memory (NVRAM). Components such as the transceiver 2101, the processor 2102, and the memory 2103 are connected by a bus 2109. In addition to a data bus, the bus 2109 may include a power bus, a control bus, and a status signal bus. However, for clarity, the various buses are marked as the bus 2109 in the figure.

The signal transmission method disclosed in the embodiments of the present application may be applied to the processor 2102 or implemented by the processor 2102. In an implementation process, the steps of the processing procedure may be completed by an integrated logical circuit of hardware of the processor 2102, or by a software instruction. The processor 2102 may be a general purpose processor, a digital signal processor, an application-specific integrated circuit, a field programmable gate array or another programmable logic device, a discrete gate or a transistor logic device, or a discrete hardware component, and can implement or execute the methods, steps, and logical block diagrams disclosed in the embodiments of the present application. The general purpose processor may be a microprocessor, any conventional processor, or the like. The steps of the methods disclosed with reference to the embodiments of the present application may be directly implemented by a hardware processor, or may be implemented by a combination of hardware of a processor and a software module. The software module may be located in a mature storage medium in the art such as a random access memory, a flash memory, a read only memory, a programmable read only memory, an electrically erasable programmable memory, or a register. The storage medium is located in the memory 2103. The processor 2102 reads information stored in the memory 2103, and implements the steps of the signal transmission method in combination with hardware of the processor 2102.

The transceiver 2101 receives a data block sent by a transmitter, where the received data block includes one or more pilot blocks, and the pilot block includes at least two consecutive pilot symbols. The processor 2102 determines a position of the one or more pilot blocks in the data block received by the transceiver 2101, estimates a phase noise value corresponding to the position of the one or more pilot blocks in the received data block, and performs phase noise compensation on a plurality of pieces of data of the received data block based on the phase noise value corresponding to the position of the one or more pilot blocks in the received data block.

Preferably, the processor 2102 determines the position of the one or more pilot blocks in the received data block in a manner that is agreed on with the transmitter; or the processor 2102 calculates the position of the one or more pilot blocks in the received data block according to a pre-agreed formula by using a length of the received data block, a quantity of the pilot blocks, and a quantity of pilot symbols included in the pilot block.

Preferably, the processor 2102 estimates, by using an interpolation algorithm and based on the phase noise value corresponding to the position of the one or more pilot blocks in the received data block, phase noise values corresponding to positions of the plurality of pieces of data of the received data block; and performs phase noise compensation on the plurality of pieces of data of the received data block based on the estimated phase noise values corresponding to the positions of the plurality of pieces of data of the received data block.

Preferably, the processor 2102 estimates, by using a weighted averaging algorithm, the phase noise value corresponding to the position of the one or more pilot blocks in the received data block.

Figure 22:
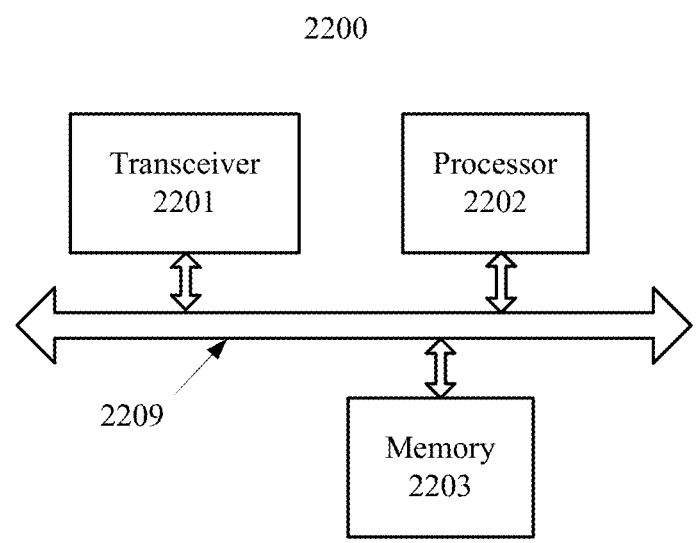
FIG. 22 is a schematic structural diagram of a signal transmission device according to an embodiment of the present application.

Based on a same idea, referring to FIG. 22, FIG. 22 shows a signal transmission device 2200 according to an embodiment of the present application. The signal transmission device 2200 may perform the steps implemented or the functions performed by the transmitter in the foregoing embodiments. The signal transmission device 2200 may include a transceiver 2201, a processor 2202, and a memory 2203. The processor 2202 is configured to control an operation of the signal transmission device 2200. The memory 2203 may include a read only memory and a random access memory and store an instruction and data executable by the processor 2202. A part of the memory 2203 may further include a non-volatile random access memory (NVRAM). Components such as the transceiver 2201, the processor 2202, and the memory 2203 are connected by a bus 2209. In addition to a data bus, the bus 2209 may include a power bus, a control bus, and a status signal bus. However, for clarity, the various buses are marked as the bus 2209 in the figure.

The signal transmission method disclosed in the embodiments of the present application may be applied to the processor 2202 or implemented by the processor 2202. In an implementation process, the steps of the processing procedure may be completed by an integrated logical circuit of hardware of the processor 2202, or by a software instruction. The processor 2202 may be a general purpose processor, a digital signal processor, an application-specific integrated circuit, a field programmable gate array or another programmable logic device, a discrete gate or a transistor logic device, or a discrete hardware component, and can implement or execute the methods, steps, and logical block diagrams disclosed in the embodiments of the present application. The general purpose processor may be a microprocessor, any conventional processor, or the like. The steps of the methods disclosed with reference to the embodiments of the present application may be directly implemented by a hardware processor, or may be implemented by a combination of hardware of a processor and a software module. The software module may be located in a mature storage medium in the art such as a random access memory, a flash memory, a read only memory, a programmable read only memory, an electrically erasable programmable memory, or a register. The storage medium is located in the memory 2203. The processor 2202 reads information stored in the memory 2203, and implements the steps of the signal transmission method in combination with hardware of the processor 2202.

The processor 2202 determines pilot block configuration information, where the pilot block configuration information includes pilot block configuration scheme information; and inserts one or more pilot blocks into a to-be-sent data block based on the pilot block configuration scheme information. The transceiver 2201 sends the pilot block configuration information determined by the processor 2202 and the to-be-sent data block into which the one or more pilot blocks are inserted.

Preferably, the processor 2202 obtains noise level information corresponding to a current time period, and determines the pilot block configuration information based on the noise level information.

Preferably, the transceiver 2201 receives noise level information sent by a receiver; or the transceiver 2201 receives a data block sent by the receiver, and the processor 2202 performs noise level estimation on the received data block, to determine the noise level information.

Preferably, the noise level information includes additive white noise information and multiplicative phase noise information; and if the additive white noise information is greater than additive white noise information obtained last time or the multiplicative phase noise information is less than multiplicative phase noise information obtained last time, the processor 2202 increases a quantity of pilot symbols included in each pilot block in the to-be-sent data block, or decreases a quantity of the pilot blocks; or if the additive white noise information is less than additive white noise information obtained last time or the multiplicative phase noise information is greater than multiplicative phase noise information obtained last time, the processor 2202 decreases a quantity of pilot symbols included in each pilot block in the to-be-sent data block, or increases a quantity of the pilot blocks.

Preferably, before the noise level information is obtained, the transceiver 2201 sends a pre-agreed training sequence to the receiver, so that the receiver performs noise level estimation based on the pre-agreed training sequence.

Preferably, the pilot block configuration scheme information includes a number of the pilot block configuration scheme; or a quantity of the pilot blocks and a quantity of pilot symbols included in the pilot block; or an offset value of a quantity of the pilot blocks and an offset value of a quantity of pilot symbols included in the pilot block.

Preferably, the processor 2202 calculates a position of the pilot block in the data block according to a pre-agreed formula by using a length of the to-be-sent data block, the quantity of the pilot blocks, and the quantity of pilot symbols in the pilot block; or calculates a position of the pilot block according to a pre-agreed formula by using a length of the to-be-sent data block, the offset value of the quantity of the pilot blocks, the offset value of the quantity of pilot symbols included in the pilot block, and a quantity of pilot blocks and a quantity of pilot symbols included in a pilot block that are in pilot block configuration information received last time; and inserts the one or more pilot blocks into the to-be-sent data block based on the position of the pilot block.

Preferably, after the pilot block configuration information is determined, the transceiver 2201 sends the pilot block configuration information to the receiver; or the processor 2202 sets the pilot block to a preset sequence or a modulation constellation diagram based on the pilot block configuration information.

Figure 23:
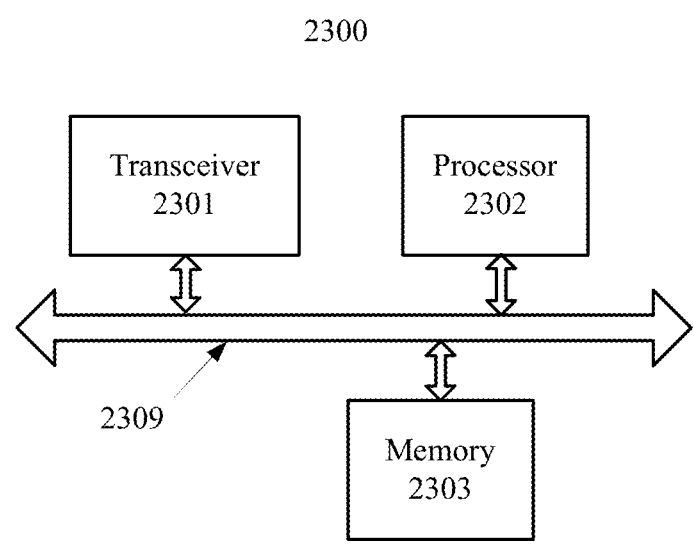
FIG. 23 is a schematic structural diagram of a signal transmission device according to an embodiment of the present application.

Based on a same idea, referring to FIG. 23, FIG. 23 shows a signal transmission device 2300 according to an embodiment of the present application. The signal transmission device 2300 may perform the steps implemented or the functions performed by the receiver in the foregoing embodiments. The signal transmission device 2300 may include a transceiver 2301, a processor 2302, and a memory 2303. The processor 2302 is configured to control an operation of the signal transmission device 2300. The memory 2303 may include a read only memory and a random access memory and store an instruction and data executable by the processor 2302. A part of the memory 2303 may further include a non-volatile random access memory (NVRAM). Components such as the transceiver 2301, the processor 2302, and the memory 2303 are connected by a bus 2309. In addition to a data bus, the bus 2309 may include a power bus, a control bus, and a status signal bus. However, for clarity, the various buses are marked as the bus 2309 in the figure.

The signal transmission method disclosed in the embodiments of the present application may be applied to the processor 2302 or implemented by the processor 2302. In an implementation process, the steps of the processing procedure may be completed by an integrated logical circuit of hardware of the processor 2302, or by a software instruction. The processor 2302 may be a general purpose processor, a digital signal processor, an application-specific integrated circuit, a field programmable gate array or another programmable logic device, a discrete gate or a transistor logic device, or a discrete hardware component, and can implement or execute the methods, steps, and logical block diagrams disclosed in the embodiments of the present application. The general purpose processor may be a microprocessor, any conventional processor, or the like. The steps of the methods disclosed with reference to the embodiments of the present application may be directly implemented by a hardware processor, or may be implemented by a combination of hardware of a processor and a software module. The software module may be located in a mature storage medium in the art such as a random access memory, a flash memory, a read only memory, a programmable read only memory, an electrically erasable programmable memory, or a register. The storage medium is located in the memory 2303. The processor 2302 reads information stored in the memory 2303, and implements the steps of the signal transmission method in combination with hardware of the processor 2302.

The transceiver 2301 receives a first data block sent by a transmitter and pilot block configuration information in the first data block. The processor 2302 determines the pilot block configuration information, where the pilot block configuration information includes pilot block configuration scheme information; estimates, based on the pilot block configuration scheme information, a phase noise value corresponding to a position of one or more pilot blocks in the first data block; and performs phase noise compensation on a plurality of pieces of data of the first data block based on the phase noise value corresponding to the position of the one or more pilot blocks in the first data block.

Preferably, before receiving the first data block sent by the transmitter and the pilot block configuration information in the first data block, the transceiver 2301 receives a second data block sent by the transmitter; the processor 2302 performs demodulation and noise level estimation on the second data block to obtain noise level information of the second data block; and the transceiver 2301 sends the noise level information to the transmitter.

Preferably, if the second data block is a pre-agreed training sequence, the processor 2302 performs noise level estimation by using the received second data block; or if the second data block is unknown data, the processor 2302 performs noise level estimation on the second data block based on a to-be-sent data block that is reconstructed after soft or hard decision decoding and the second data block.

Preferably, the pilot block configuration scheme information includes a number of the pilot block configuration scheme; or a quantity of the pilot blocks and a quantity of pilot symbols included in the pilot block; or an offset value of a quantity of the pilot blocks and an offset value of a quantity of pilot symbols included in the pilot block.

Preferably, if the pilot block configuration scheme information includes the quantity of the pilot blocks and the quantity of pilot symbols included in the pilot block, the processor 2302 calculates the position of the pilot block in the first data block according to a pre-agreed formula by using a length of the first data block, the quantity of the pilot blocks, and the quantity of pilot symbols in the pilot block; and estimates a phase noise level corresponding to the position of the one or more pilot blocks; or if the pilot block configuration scheme information includes the offset value of the quantity of the pilot blocks and the offset value of the quantity of pilot symbols included in the pilot block, the processor 2302 calculates the position of the pilot block in the first data block according to a pre-agreed formula by using a length of the first data block, the offset value of the quantity of the pilot blocks, the offset value of the quantity of pilot symbols included in the pilot block, and a quantity of pilot blocks and a quantity of pilot symbols included in a pilot block that are in pilot block configuration information received last time; and estimates a phase noise level corresponding to the position of the one or more pilot blocks.

Preferably, the processor 2302 obtains pilot block configuration information sent by the transmitter; or the processor 2302 determines the pilot block configuration information based on a preset sequence or a modulation constellation diagram in the first data block.

A person skilled in the art should understand that the embodiments of the present application may be provided as a method or a computer program product. Therefore, the present application may use a form of hardware only embodiment, software only embodiment, or embodiment with a combination of software and hardware. Moreover, the present application may use a form of a computer program product that is implemented on one or more computer-usable storage media (including but not limited to a magnetic disk storage, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present application have been described, a person skilled in the art can make changes and modifications to these embodiments once they learn the basic inventive concept. Therefore, the following claims are intended to be construed as to cover the preferred embodiments and all changes and modifications falling within the scope of the present application.

Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A signal transmission method comprising:
receiving, by a receiving device, a data block from a transmitting device, wherein the data block is within one orthogonal frequency division multiplexing (OFDM) symbol;
determining, by the receiving device, pilot block configuration information,
wherein the pilot block configuration information comprises a quantity of one or more pilot blocks in the data block and a quantity of pilot symbols comprised in one pilot block, and
wherein the data block comprises a plurality of pieces of data, each of the plurality of pieces of data comprises one or more modulation symbols, and there is a sequence for cyclic prefix in front of the data block; and
obtaining, by the receiving device, a position of the one or more pilot blocks in the data block according to a pre-agreed formula by using (a) a length of the data block, (b) the quantity of the one or more pilot blocks, and (c) the quantity of pilot symbols in one pilot block.

2. The method according to claim 1, further comprising:
estimating, by the receiving device, a phase noise value associated with the position of the one or more pilot blocks in the data block; and
performing, by the receiving device, phase noise compensation on a plurality of pieces of data of the data block based on the phase noise value associated with the position of the one or more pilot blocks in the data block.

3. The method according to claim 1, wherein each of the one or more the pilot blocks comprises at least two consecutive pilot symbols.

4. The method according to claim 1, wherein determining the pilot block configuration information comprises:
obtaining, by the receiving device, the pilot block configuration information from the transmitting device.

5. The method according to claim 1, wherein determining the pilot block configuration information comprises:
determining, by the receiving device, the pilot block configuration information based on a preset sequence or the modulation symbol in the data block.

6. A signal transmission apparatus, comprising a receiver and a processor, wherein
the receiver is configured to cooperate with the processor to receive a data block from a transmitter, wherein the data block is within one orthogonal frequency division multiplexing (OFDM) symbol; and the processor is configured to:
- determine pilot block configuration information,
  - wherein the pilot block configuration information comprises a quantity of one or more pilot blocks in the data block and a quantity of pilot symbols comprised in one pilot block, and
  - wherein the data block comprises a plurality of pieces of data, each of the plurality of pieces of data comprises one or more modulation symbols, and there is a sequence for cyclic prefix in front of the data block; and
- obtain a position of the one or more pilot blocks in the data block according to a pre-agreed formula by using (a) a length of the data block, (b) the quantity of the one or more pilot blocks, and (c) the quantity of pilot symbols in one pilot block.

7. The apparatus according to claim 6, wherein the processor is configured to:
- estimate a phase noise value associated with the position of the one or more pilot blocks in the data block; and
- perform phase noise compensation on a plurality of pieces of data of the data block based on the phase noise value associated with the position of the one or more pilot blocks in the data block.

8. The apparatus according to claim 6, wherein each of the one or more pilot blocks comprises at least two consecutive pilot symbols.

9. The apparatus according to claim 6, wherein the processor is configured to control the receiver to obtain the pilot block configuration information from the transmitter.

10. The apparatus according to claim 6, wherein the processor is configured to:
- determine the pilot block configuration information based on a preset sequence or the modulation symbol in the data block.

11. A non-transitory computer-readable medium storing computer-executable instructions which when executed by a processor of a signal transmission device, cause the device to implement operations including:

receiving a data block from a transmitter, wherein the data block is within one orthogonal frequency division multiplexing (OFDM) symbol;

determining pilot block configuration information,
- wherein the pilot block configuration information comprises a quantity of one or more pilot blocks in the data block and a quantity of pilot symbols comprised in one pilot block,
- wherein the data block comprises a plurality of pieces of data, each of the plurality of pieces of data comprises one or more modulation symbols, and there is a sequence for cyclic prefix in front of the data block; and obtaining a position of the one or more pilot blocks in the data block according to a pre-agreed formula by using (a) a length of the data block, (b) the quantity of the one or more pilot blocks, and (c) the quantity of pilot symbols in one pilot block.

12. The non-transitory computer-readable medium according to claim 11, wherein the operations further include:
- estimating a phase noise value associated with the position of the one or more pilot blocks in the data block; and
- performing phase noise compensation on a plurality of pieces of data of the data block based on the phase noise value associated with the position of the one or more pilot blocks in the data block.

13. The non-transitory computer-readable medium according to claim 11, wherein each of the one or more pilot blocks comprises at least two consecutive pilot symbols.

14. The non-transitory computer-readable medium according to claim 11, wherein the operations further include:
- obtaining the pilot block configuration information from the transmitter.

15. The non-transitory computer-readable medium according to claim 11, wherein the operations further include:
- determining the pilot block configuration information based on a preset sequence or the modulation symbol in the data block.

* * * * *